(12) United States Patent
Deng et al.

(10) Patent No.: US 11,012,995 B2
(45) Date of Patent: May 18, 2021

(54) FEEDBACK INFORMATION TRANSMISSION METHOD AND APPARATUS

(71) Applicant: Huawei Technologies Co., Ltd., Shenzhen (CN)

(72) Inventors: Na Deng, Shenzhen (CN); Yuanjie Li, Shanghai (CN); Ting Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/363,253

(22) Filed: Mar. 25, 2019

(65) Prior Publication Data

US 2019/0223170 A1 Jul. 18, 2019

Related U.S. Application Data

(63) Continuation of application No. PCT/CN2017/103410, filed on Sep. 26, 2017.

(30) Foreign Application Priority Data

Sep. 26, 2016 (CN) .......................... 201610850512.6

(51) Int. Cl.
*H04W 4/00* (2018.01)
*H04W 72/04* (2009.01)
(Continued)

(52) U.S. Cl.
CPC ............. *H04W 72/044* (2013.01); *H04L 1/16* (2013.01); *H04L 1/1861* (2013.01); *H04L 5/00* (2013.01); *H04W 72/042* (2013.01)

(58) Field of Classification Search
CPC .... H04W 72/044; H04W 72/042; H04L 5/00; H04L 1/1861; H04L 1/16; H04L 5/0055; H04L 5/0053; H04L 5/0044
(Continued)

(56) References Cited

U.S. PATENT DOCUMENTS 9,985,755 B2 * 5/2018 Yan ........................... H04L 1/08
10,681,686 B2 * 6/2020 Ji ........................ H04W 72/042
(Continued)

FOREIGN PATENT DOCUMENTS

CN 101547069 A 9/2009
CN 101873706 A 10/2010
(Continued)

OTHER PUBLICATIONS

Machine Translation and Abstract of Chinese Publication No. CN101547069, dated Sep. 30, 2009, 23 pages.
(Continued)

*Primary Examiner* — Chuong T Ho
(74) *Attorney, Agent, or Firm* — Conley Rose, P.C.

(57) ABSTRACT

A feedback information transmission method and apparatus, and the method includes receiving, by a terminal device, N pieces of first data from N first transmission points, where the N first transmission points are in a one-to-one correspondence with the N pieces of first data, each piece of first data includes at least one transport block, and the N pieces of first data are carried on a same carrier, where N≥2, and sending, by the terminal device, feedback information of the N pieces of first data on at least one time-frequency resource such that acknowledgement (ACK)/negative ACK (NACK) feedback in coordinated multipoint multi-stream transmission can be implemented.

20 Claims, 3 Drawing Sheets

(51) Int. Cl.
*H04L 1/16* (2006.01)
*H04L 1/18* (2006.01)
*H04L 5/00* (2006.01)

(58) Field of Classification Search
USPC .................................................. 370/329, 330
See application file for complete search history.

(56) References Cited

U.S. PATENT DOCUMENTS

| | | | |
|---|---|---|---|
| 2009/0063804 | A1 | 3/2009 | Trainin |
| 2010/0177746 | A1 | 7/2010 | Gorokhov et al. |
| 2011/0274026 | A1* | 11/2011 | Huang ............... H04J 11/0069 370/312 |
| 2012/0044871 | A1 | 2/2012 | Li et al. |
| 2012/0082145 | A1 | 4/2012 | Chen et al. |
| 2014/0036881 | A1* | 2/2014 | Kim ..................... H04L 5/003 370/336 |
| 2014/0098770 | A1* | 4/2014 | Zhou ................... H04L 1/1887 370/329 |
| 2014/0192744 | A1* | 7/2014 | Zhou ................... H04B 7/0626 370/329 |
| 2015/0092624 | A1* | 4/2015 | Yao .................... H04L 5/1461 370/278 |
| 2015/0103774 | A1* | 4/2015 | Nagata ................ H04B 7/024 370/329 |
| 2015/0236760 | A1* | 8/2015 | Sun .................... H04B 7/0632 375/267 |
| 2016/0044690 | A1* | 2/2016 | Li ...................... H04W 12/0401 370/329 |
| 2016/0233990 | A1* | 8/2016 | Yan .................... H04L 1/1858 |
| 2018/0278373 | A1* | 9/2018 | Wang .................. H04L 1/1854 |
| 2018/0310288 | A1* | 10/2018 | Ji ...................... H04L 1/1893 |
| 2020/0296703 | A1* | 9/2020 | Ji ...................... H04L 1/0004 |

FOREIGN PATENT DOCUMENTS

| | | |
|---|---|---|
| CN | 101931989 A | 12/2010 |
| CN | 102006150 A | 4/2011 |
| CN | 102026377 A | 4/2011 |
| CN | 102833053 A | 12/2012 |
| CN | 103516489 A | 1/2014 |
| CN | 103973413 A | 8/2014 |
| EP | 2809023 A1 | 12/2014 |

OTHER PUBLICATIONS

Machine Translation and Abstract of Chinese Publication No. CN102006150, dated Apr. 6, 2011, 20 pages.
Machine Translation and Abstract of Chinese Publication No. CN103516489, dated Jan. 15, 2014, 47 pages.
Foreign Communication From a Counterpart Application, PCT Application No. PCT/CN2017/103410, English Translation of International Search Report dated Jan. 3, 2018, 2 pages.
Foreign Communication From a Counterpart Application, PCT Application No. PCT/CN2017/103410, English Translation of Written Opinion dated Jan. 3, 2018, 6 pages.
Machine Translation and Abstract of Chinese Publication No. CN101931989, dated Dec. 29, 2010, 25 pages.
Machine Translation and Abstract of Chinese Publication No. CN102026377, dated Apr. 20, 2011, 30 pages.
Machine Translation and Abstract of Chinese Publication No. CN103973413, dated Aug. 6, 2014, 61 pages.
Foreign Communication From a Counterpart Application, Chinese Application No. 201610850512.6, Chinese Office Action dated Sep. 26, 2019, 5 pages.
Foreign Communication From a Counterpart Application, Chinese Application No. 201610850512.6, Chinese Search Report dated Sep. 17, 2019, 2 pages.
Huawei, et al. "WF on non-coherent JT schemes for FeCoMP," 3GPP TSG RAN WG1 #86, R1-168267, XP051143903, Gothenburg, Sweden, Aug. 22-26, 2016, 4 pages.
Huawei, et al., "Overview on further enhancements to Coordinated Multi-Point operation," 3GPP TSG RAN WG1 Meeting #85, R1-164084, XP051096600, Nanjing, China, May 23-27, 2016, 3 pages.
Foreign Communication From a Counterpart Application, European Application No. 17852448.4, Extended European Search Report dated Aug. 16, 2019, 10 pages.

\* cited by examiner

FEEDBACK INFORMATION TRANSMISSION METHOD AND APPARATUS

CROSS-REFERENCE TO RELATED APPLICATIONS

This application is a continuation of International Patent Application No. PCT/CN2017/103410 filed on Sep. 26, 2017, which claims priority to Chinese Patent Application No. 201610850512.6 filed on Sep. 26, 2016. The disclosures of the aforementioned applications are hereby incorporated by reference in their entireties.

TECHNICAL FIELD

This application relates to the communications field, and in particular, to a feedback information transmission method and apparatus.

BACKGROUND

With development of communications technologies, a coordinated multipoint multi-stream transmission technology such as a coordinated multipoint transmission (CoMP) technology is proposed such that a plurality of pieces of data (for example, Physical Downlink Shared Channels (PD-SCHs)) can be transmitted using a same carrier, that is, a terminal device can receive a plurality of pieces of data from a plurality of different transmission points using one carrier.

In coordinated multipoint multi-stream transmission, a plurality of transmission points transmit different data to a single user on a same carrier. Each transmission point independently transmits different data or transport blocks (TBs). Each transmission point can transmit a maximum of two TBs.

It is desirable to provide a technology that can support data reception acknowledgement feedback of the coordinated multipoint multi-stream transmission technology.

SUMMARY

Embodiments of this application provide a feedback information transmission method and apparatus, to support data reception acknowledgement feedback of a coordinated multipoint multi-stream transmission technology.

According to a first aspect, a feedback information transmission method is provided, and the method includes receiving, by a terminal device, N pieces of first data sent by N first transmission points, where the N first transmission points are in a one-to-one correspondence with the N pieces of first data, each piece of first data includes at least one transport block sent by a corresponding transmission point, and the N pieces of first data are carried on a same carrier, where N≥2, and sending, by the terminal device, feedback information of the N pieces of first data using at least one time-frequency resource.

With reference to the first aspect, in a first implementation of the first aspect, the N pieces of first data are in a one-to-one correspondence with N pieces of downlink control information, each piece of first data is received by the terminal device based on corresponding downlink control information, the N pieces of downlink control information are in a one-to-one correspondence with N downlink control channels, and each piece of downlink control information is carried on a corresponding downlink control channel.

With reference to the first aspect and the foregoing implementation of the first aspect, in a second implementation of the first aspect, sending, by the terminal device, feedback information of the N pieces of first data using at least one time-frequency resource includes determining, by the terminal device, N time-frequency resource groups based on the N downlink control channels, where each time-frequency resource group includes at least one time-frequency resource used to transmit feedback information, the N downlink control channels are in a one-to-one correspondence with the N time-frequency resource groups, and each time-frequency resource group is determined based on a corresponding downlink control channel, and sending, by the terminal device, the feedback information of the N pieces of first data using the N time-frequency resource groups, where the feedback information of the N pieces of first data is in a one-to-one correspondence with the N time-frequency resource groups, and feedback information of each piece of first data is carried on a corresponding time-frequency resource group.

Therefore, when downlink data transmission information of the N first transmission points is carried in the N pieces of downlink control information, a time-frequency resource used to transmit the feedback information of each piece of first data can be easily determined based on the N pieces of downlink control information, to improve practicability of feedback information transmission in this embodiment of this application.

With reference to the first aspect and the foregoing implementation of the first aspect, in a third implementation of the first aspect, the N pieces of first data correspond to one piece of downlink control information, the one piece of downlink control information includes downlink data transmission information of the N first transmission points, one piece of first data is received by the terminal device based on downlink data transmission information that is in the downlink control information and that is of a first transmission point sending the one piece of first data, and the downlink control information is carried on one downlink control channel.

With reference to the first aspect and the foregoing implementation of the first aspect, in a fourth implementation of the first aspect, when N=2, sending, by the terminal device, feedback information of the N pieces of first data using at least one time-frequency resource includes determining, by the terminal device, one time-frequency resource group based on the downlink control channel, where the one time-frequency resource group includes at least one time-frequency resource, and sending, by the terminal device, the feedback information of the N pieces of first data using the one time-frequency resource group.

Therefore, when N=2 and the downlink data transmission information of the N first transmission points is carried in one piece of downlink control information, a time-frequency resource used to transmit feedback information of each piece of first data can be easily determined based on the one piece of downlink control information, to improve practicability of feedback information transmission in this embodiment of this application.

With reference to the first aspect and the foregoing implementation of the first aspect, in a fifth implementation of the first aspect, the sending, by the terminal device, the feedback information of the N pieces of first data using the one time-frequency resource group includes sending, by the terminal device, the feedback information of the N pieces of first data using the one time-frequency resource group and a time-frequency resource indicated by received first signaling.

Therefore, when the downlink data transmission information of the N first transmission points is carried in one piece of downlink control information, the time-frequency resource used to transmit the feedback information of each piece of first data can be determined based on the one piece of downlink control information and the time-frequency resource indicated by the first signaling such that a quantity of time-frequency resources can meet a feedback information requirement, to improve reliability of feedback information transmission in this embodiment of this application.

With reference to the first aspect and the foregoing implementation of the first aspect, in a sixth implementation of the first aspect, sending, by the terminal device, feedback information of the N pieces of first data using at least one time-frequency resource includes determining, by the terminal device, a time-frequency resource group K from a plurality of time-frequency resources and a bit sequence L from a plurality of bit sequences based on the feedback information of the N pieces of first data and a preset first mapping relationship, where the first mapping relationship is used to indicate a mapping relationship between a plurality of first transmission resource combinations and a plurality of first feedback value combinations, each first transmission resource combination includes at least one of the plurality of time-frequency resources and at least one of the plurality of bit sequences, each first feedback value combination includes N groups of feedback values, a first transmission resource combination to which the time-frequency resource group K and the bit sequence L belong corresponds to a first feedback value combination to which a feedback value of the feedback information of the N pieces of first data belongs, each group of feedback values includes at least one feedback value, and each bit sequence includes at least two bits, and sending, by the terminal device, the bit sequence L using the time-frequency resource group K.

Therefore, transmission of each piece of feedback information can be completed based on the mapping relationship using a few (for example, one or two) time-frequency resources, to reduce resource overheads and improve practicability of feedback information transmission in this embodiment of this application.

With reference to the first aspect and the foregoing implementation of the first aspect, in a seventh implementation of the first aspect, sending, by the terminal device, feedback information of the N pieces of first data using one time-frequency resource includes sending, by the terminal device, the feedback information of the N pieces of first data according to a first order based on one time-frequency resource indicated by received third signaling, where the first order is a ranking order of the feedback information of the N pieces of first data on the one time-frequency resource.

Therefore, transmission of each piece of feedback information can be completed according to the first order using one time-frequency resource to reduce resource overheads and improve practicability of feedback information transmission in this embodiment of this application.

With reference to the first aspect and the foregoing implementation of the first aspect, in an eighth implementation of the first aspect, indication information of the first order is preconfigured in the terminal device, or the method further includes receiving, by the terminal device, fourth signaling, where the signaling is used to indicate the first order.

With reference to the first aspect and the foregoing implementations of the first aspect, in a ninth implementation of the first aspect, the method further includes receiving, by the terminal device, fifth signaling, where the fifth signaling is used to indicate a target feedback manner in a plurality of feedback manners, and the target feedback manner is a feedback manner of the feedback information of the N pieces of first data, and sending, by the terminal device, feedback information of the N pieces of first data using at least one time-frequency resource includes sending, by the terminal device, the feedback information of the N pieces of first data using the at least one time-frequency resource in the target feedback manner indicated by the fifth signaling.

Therefore, the plurality of feedback manners are configured, and a transmission point indicates, using signaling, a feedback manner currently used by the terminal device to improve flexibility of feedback information transmission in this application.

With reference to the first aspect and the foregoing implementations of the first aspect, in a tenth implementation of the first aspect, the N first transmission points include a first serving transmission point and N−1 first coordinated transmission points of the terminal device, and the method further includes receiving, by the terminal device, second data sent by a second transmission point, where the first data and the second data are carried on different carriers, and sending, by the terminal device, feedback information of the N pieces of first data using at least one time-frequency resource includes sending, by the terminal device, feedback information of first data of the N−1 first coordinated transmission points, feedback information of first data of the first serving transmission point, and feedback information of the second data using the at least one time-frequency resource.

With reference to the first aspect and the foregoing implementation of the first aspect, in an eleventh implementation of the first aspect, sending, by the terminal device, feedback information of first data of the N−1 first coordinated transmission points, feedback information of first data of the first serving transmission point, and feedback information of the second data using the at least one time-frequency resource includes sending, by the terminal device, the feedback information of the first data of the N−1 first coordinated transmission points using at least one first time-frequency resource, and sending the feedback information of the first data of the first serving transmission point and the feedback information of the second data using at least one second time-frequency resource, or sending, by the terminal device, the feedback information of the first data of the N−1 first coordinated transmission points and the feedback information of the first data of the first serving transmission point using at least one first time-frequency resource, and sending the feedback information of the second data using at least one second time-frequency resource.

With reference to the first aspect and the foregoing implementation of the first aspect, in a twelfth implementation of the first aspect, when N≥3, the sending, by the terminal device, the feedback information of the first data of the N−1 first coordinated transmission points using at least one first time-frequency resource includes determining, by the terminal device, a time-frequency resource group S from a plurality of time-frequency resources and a bit sequence F from a plurality of bit sequences based on the feedback information of the first data of the N−1 first coordinated transmission points and a preset second mapping relationship, where the second mapping relationship is used to indicate a mapping relationship between a plurality of second transmission resource combinations and a plurality of second feedback value combinations, each second transmission resource combination includes at least one of the plurality of time-frequency resources and at least one of the plurality of bit sequences, each second feedback value combination includes N−1 groups of feedback values, a second transmission resource combination to which the time-frequency resource group S and the bit sequence F belong corresponds to a second feedback value combination to which a feedback value of the feedback information of the first data of the N−1 first coordinated transmission points belongs, each group of feedback values includes at least one feedback value, each bit sequence includes at least two bits, and the time-frequency resource group S includes the at least one of the plurality of time-frequency resources, and sending, by the terminal device, the bit sequence F using the time-frequency resource group S.

With reference to the first aspect and the foregoing implementation of the first aspect, in a thirteenth implementation of the first aspect, sending, by the terminal device, feedback information of first data of the N−1 first coordinated transmission points, feedback information of first data of the first serving transmission point, and feedback information of the second data using the at least one time-frequency resource includes sending, by the terminal device, the feedback information of the first data of the N−1 first coordinated transmission points, the feedback information of the first data of the first serving transmission point, and the feedback information of the second data according to a second order based on one time-frequency resource indicated by received sixth signaling.

With reference to the first aspect and the foregoing implementation of the first aspect, in a fourteenth implementation of the first aspect, indication information of the second order is preconfigured in the terminal device, or the method further includes receiving, by the terminal device, seventh signaling, where the signaling is used to indicate the second order, and the second order is a ranking order of the feedback information of the first data of the N−1 first coordinated transmission points, the feedback information of the first data of the first serving transmission point, and the feedback information of the second data on the one time-frequency resource.

With reference to the first aspect and the foregoing implementation of the first aspect, in a fifteenth implementation of the first aspect, the plurality of time-frequency resources include a time-frequency resource determined based on a downlink control channel, and/or the plurality of time-frequency resources include a time-frequency resource indicated by second signaling received by the terminal device.

According to a second aspect, a feedback information transmission method is provided, and the method includes sending, by a first transmission point Ti in N first transmission points, first data Di in N pieces of first data to a terminal device, where the N first transmission points are in a one-to-one correspondence with the N pieces of first data, each piece of first data includes at least one transport block sent by a corresponding transmission point, and the N pieces of first data are carried on a same carrier, where N≥2, and receiving, by the first transmission point Ti, feedback information of the first data Di, where feedback information of the N pieces of first data including the feedback information of the first data Di is carried on at least one time-frequency resource.

With reference to the second aspect, in a first implementation of the second aspect, the N pieces of first data are in a one-to-one correspondence with N pieces of downlink control information, each piece of first data is received by the terminal device based on corresponding downlink control information, the N pieces of downlink control information are in a one-to-one correspondence with N downlink control channels, and each piece of downlink control information is carried on a corresponding downlink control channel.

With reference to the second aspect and the foregoing implementation of the second aspect, in a second implementation of the second aspect, receiving, by the first transmission point Ti, feedback information of the first data Di includes determining, by the first transmission point Ti, a time-frequency resource group T in N time-frequency resource groups based on a downlink control channel T in the N downlink control channels, where each time-frequency resource group includes at least one time-frequency resource used to transmit feedback information, the N downlink control channels are in a one-to-one correspondence with the N time-frequency resource groups, each time-frequency resource group is determined based on a corresponding downlink control channel, the feedback information of the N pieces of first data are in a one-to-one correspondence with the N time-frequency resource groups, and feedback information of each piece of first data is carried on a corresponding time-frequency resource group, and receiving, by the first transmission point Ti, the feedback information of the first data Di using the time-frequency resource group T.

With reference to the second aspect and the foregoing implementation of the second aspect, in a third implementation of the second aspect, the N pieces of first data correspond to one piece of downlink control information, the one piece of downlink control information includes downlink data transmission information of the N first transmission points, one piece of first data is received by the terminal device based on downlink data transmission information that is in the downlink control information and that is of a first transmission point sending the one piece of first data, and the downlink control information is carried on one downlink control channel.

With reference to the second aspect and the foregoing implementation of the second aspect, in a fourth implementation of the second aspect, when N=2, receiving, by the first transmission point Ti, feedback information of the first data Di includes determining, by the first transmission point Ti, one time-frequency resource group based on the downlink control channel, where the one time-frequency resource group includes at least one time-frequency resource, and receiving, by the first transmission point Ti, the feedback information of the first data Di using the one time-frequency resource group.

With reference to the second aspect and the foregoing implementation of the second aspect, in a fifth implementation of the second aspect, receiving, by the first transmission point Ti, the feedback information of the first data Di using the one time-frequency resource group includes receiving, by the first transmission point Ti, the feedback information of the first data Di using the one time-frequency resource group and a time-frequency resource indicated by first signaling.

With reference to the second aspect and the foregoing implementation of the second aspect, in a sixth implementation of the second aspect, receiving, by the first transmission point Ti, feedback information of the first data Di includes receiving, by the first transmission point Ti using a time-frequency resource group K in a plurality of time-frequency resources, a bit sequence L in a plurality of bit sequences sent by the terminal device, where each bit sequence includes at least two bits, determining, by the first transmission point Ti, the feedback information of the N pieces of first data based on the time-frequency resource group K, the bit sequence L, and a preset first mapping relationship, where the first mapping relationship is used to indicate a mapping relationship between a plurality of first transmission resource combinations and a plurality of first feedback value combinations, each first transmission resource combination includes at least one of the plurality of time-frequency resources and at least one of the plurality of bit sequences, each first feedback value combination includes N groups of feedback values, a first transmission resource combination to which the time-frequency resource group K and the bit sequence L belong corresponds to a first feedback value combination to which a feedback value of the feedback information of the N pieces of first data belongs, and each group of feedback values includes at least one feedback value, and determining, by the first transmission point Ti, the feedback information of the first data Di from the feedback information of the N pieces of first data.

With reference to the second aspect and the foregoing implementation of the second aspect, in a seventh implementation of the second aspect, receiving, by the first transmission point Ti, feedback information of the first data Di includes receiving, by the first transmission point Ti, the feedback information of the N pieces of first data based on one time-frequency resource indicated by third signaling, where the feedback information of the N pieces of first data is sent by the terminal device according to a first order, and determining, by the first transmission point Ti, the feedback information of the first data Di from the feedback information of the N pieces of first data according to the first order.

With reference to the second aspect and the foregoing implementation of the second aspect, in an eighth implementation of the second aspect, indication information of the first order is preconfigured in the first transmission point Ti, or the method further includes sending, by the first transmission point Ti, fourth signaling to the terminal device, where the signaling is used to indicate the first order.

With reference to the second aspect and the foregoing implementations of the second aspect, in a ninth implementation of the second aspect, receiving, by the first transmission point Ti, feedback information of the first data Di includes determining, by the first transmission point Ti, a target feedback manner from a plurality of feedback manners, where the target feedback manner is a manner that is indicated by fifth signaling and that is of sending the feedback information of the N pieces of first data by the terminal device, and receiving, by the first transmission point Ti, the feedback information of the first data Di in the target feedback manner.

With reference to the second aspect and the foregoing implementations of the second aspect, in a tenth implementation of the second aspect, the N first transmission points include a first serving transmission point and N−1 first coordinated transmission points of the terminal device, the first data and second data are carried on different carriers, and the second data is sent by a second transmission point to the terminal device.

With reference to the second aspect and the foregoing implementation of the second aspect, in an eleventh implementation of the second aspect, feedback information of first data of the N−1 first coordinated transmission points is carried on at least one first time-frequency resource, and feedback information of first data of the first serving transmission point and feedback information of the second data are carried on at least one second time-frequency resource, or feedback information of first data of the N−1 first coordinated transmission points and feedback information of first data of the first serving transmission point are carried on at least one first time-frequency resource, and feedback information of the second data is carried on at least one second time-frequency resource.

With reference to the second aspect and the foregoing implementation of the second aspect, in a twelfth implementation of the second aspect, when N≥3, receiving, by the first transmission point Ti, feedback information of the first data Di includes receiving, by the first transmission point Ti using at least one time-frequency resource group S in a plurality of time-frequency resources, a bit sequence F in a plurality of bit sequences sent by the terminal device, where each bit sequence includes at least two bits, determining, by the first transmission point Ti, the feedback information of the first data of the N−1 first coordinated transmission points based on the at least one time-frequency resource group S, the bit sequence F, and a preset second mapping relationship, where the second mapping relationship is used to indicate a mapping relationship between a plurality of second transmission resource combinations and a plurality of second feedback value combinations, each second transmission resource combination includes at least one of the plurality of time-frequency resources and at least one of the plurality of bit sequences, each second feedback value combination includes N−1 groups of feedback values, a second transmission resource combination to which the time-frequency resource group S and the bit sequence F belong corresponds to a second feedback value combination to which a feedback value of the feedback information of the first data of the N−1 first coordinated transmission points belongs, and each group of feedback values includes at least one feedback value, and determining, by the first transmission point Ti, the feedback information of the first data Di from the feedback information of the first data of the N−1 first coordinated transmission points.

With reference to the second aspect and the foregoing implementation of the second aspect, in a thirteenth implementation of the second aspect, receiving, by the first transmission point Ti, feedback information of the first data Di includes receiving, by the first transmission point Ti, the feedback information of the first data of the N−1 first coordinated transmission points, the feedback information of the first data of the first serving transmission point, and the feedback information of the second data based on one time-frequency resource indicated by sixth signaling, where the feedback information of the first data of the N−1 first coordinated transmission points, the feedback information of the first data of the first serving transmission point, and the feedback information of the second data are sent by the terminal device according to a second order, and determining, by the first transmission point Ti, the feedback information of the first data Di from the feedback information of the first data of the N−1 first coordinated transmission points, the feedback information of the first data of the first serving transmission point, and the feedback information of the second data according to the second order.

With reference to the second aspect and the foregoing implementation of the second aspect, in a fourteenth implementation of the second aspect, indication information of the second order is preconfigured in the first transmission point Ti, or the method further includes sending, by the first transmission point Ti, seventh signaling to the terminal device, where the signaling is used to indicate the second order.

With reference to the second aspect and the foregoing implementation of the second aspect, in a fifteenth implementation of the second aspect, the plurality of time-frequency resources include a time-frequency resource determined based on a downlink control channel, and/or the plurality of time-frequency resources include a time-frequency resource indicated by second signaling received by the terminal device.

According to a third aspect, a feedback information transmission apparatus is provided, including units configured to perform the steps of the feedback information transmission method in the first aspect and the implementations of the first aspect.

According to a fourth aspect, a feedback information transmission apparatus is provided, including units configured to perform the steps of the feedback information transmission method in the second aspect and the implementations of the second aspect.

According to a fifth aspect, a feedback information transmission device is provided, including a memory and a processor. The memory is configured to store a computer program, and the processor is configured to invoke the computer program from the memory and run the computer program such that the feedback information transmission device performs the feedback information transmission method in any one of the first aspect and the implementations of the first aspect.

According to a sixth aspect, a feedback information transmission device is provided, including a memory and a processor. The memory is configured to store a computer program, and the processor is configured to invoke the computer program from the memory and run the computer program such that the feedback information transmission device performs the feedback information transmission method in any one of the second aspect and the implementations of the second aspect.

According to a seventh aspect, a computer program product is provided, the computer program product includes computer program code, and when the computer program code is run by a receiving unit, a processing unit, and a sending unit or a receiver, a processor, and a transmitter of a terminal device, the terminal device performs the feedback information transmission method in any one of the first aspect and the implementations of the first aspect.

According to an eighth aspect, a computer program product is provided, the computer program product includes computer program code, and when the computer program code is run by a receiving unit, a processing unit, and a sending unit or a receiver, a processor, and a transmitter of a transmission point, the transmission point performs the feedback information transmission method in any one of the second aspect and the implementations of the second aspect.

According to a ninth aspect, a computer readable storage medium is provided. The computer readable storage medium stores a program, and the program enables a terminal device to perform the feedback information transmission method in any one of the first aspect and the implementations of the first aspect.

According to a tenth aspect, a computer readable storage medium is provided. The computer readable storage medium stores a program, and the program enables a transmission point to perform the feedback information transmission method in any one of the second aspect and the implementations of the second aspect.

According to the feedback information transmission method, apparatus, and device in the embodiments of this application, in a coordinated multipoint multi-stream transmission technology, after receiving, using a same carrier, a plurality of pieces of data transmitted by a plurality of transmission points, the terminal device sends feedback information of the plurality of pieces of data to the plurality of transmission points using one or more time-frequency resources such that the plurality of transmission points learn of a receiving status of transmitted data to support data reception acknowledgement feedback of the coordinated multipoint multi-stream transmission technology.

DESCRIPTION OF EMBODIMENTS

Figure 1:
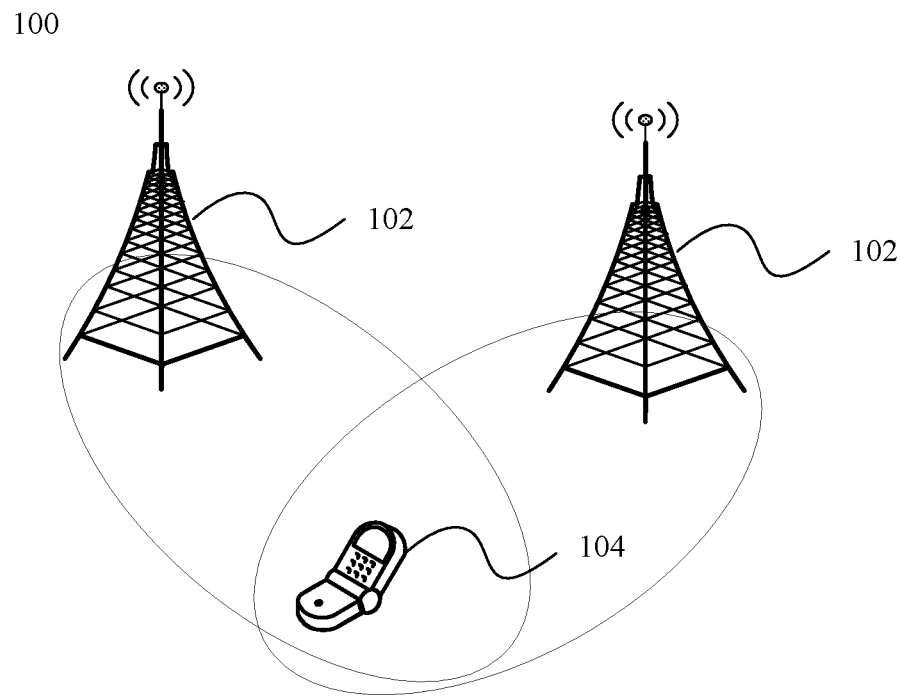
FIG. 1 is a schematic diagram of an example of a communications system that is applicable to a feedback information transmission method according to an embodiment of this application.

The following describes technical solutions of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. Both a computing device and an application that runs on a computing device may be components. One or more components may reside within a process and/or a thread of execution, and a component may be located on one computer and/or distributed between two or more computers. In addition, these components may be executed from various computer readable media that store various data structures. For example, the components may communicate using a local and/or remote process and according to, for example, a signal having one or more data packets (for example, data from a component interacting with another component in a local system, a distributed system, and/or across a network such as the Internet interacting with other systems using the signal).

The solutions in the embodiments of this application may be applied to an existing cellular communications system such as a Global System for Mobile Communications (GSM), a Wideband Code Division Multiple Access (WCDMA) system, or a Long Term Evolution (LTE) system. Supported communication is mainly voice and data communication. Usually, a conventional base station supports a limited quantity of connections, and implementation is easy.

Optionally, the transmission point is a base station, and the terminal device is user equipment.

The embodiments are described with reference to the terminal device in this application. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (ST) in a wireless local area network (WLAN), a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network or a terminal device in a future evolved PLMN network, or the like.

In addition, the embodiments are described with reference to the transmission point in this application. The transmission point may be a device such as a network device configured to communicate with a mobile device. The transmission point may be an access point (AP) in a wireless local area network (WLAN), a base transceiver station (BTS) in GSM or Code Division Multiple Access (CDMA), or a NodeB (NB) in WCDMA, or may be an evolved NodeB (eNB or eNodeB) in Long Term Evolution (LTE), a relay station or an access point, a remote radio unit (RRU) or an in-vehicle device, a wearable device, a network device in a future fifth generation (5G) network or a network device in a future evolved public land mobile network (PLMN) network, or the like.

A feedback information transmission method, apparatus, and device provided in the embodiments of this application may be applied to the terminal device or the transmission point. The terminal device or the transmission point includes a hardware layer, an operating system layer running above the hardware layer, and an application layer running above the operating system layer. The hardware layer includes hardware such as a central processing unit (CPU), a memory management unit (MMU), and a memory (also referred to a main memory). The operating system layer may be any one or more computer operating systems that implement service processing using a process, for example, a LINUX operating system, a UNIX operating system, an ANDROID operating system, an IOS operating system, or a WINDOWS operating system. The application layer includes applications such as a browser, a contact list, word processing software, and instant messaging software. In addition, in the embodiments of this application, the terminal device may be a handheld device such as a smartphone, or may be a terminal device such as a personal computer. This is not limited in this application, provided that a program recording code of the feedback information transmission method in the embodiments of this application can be used to perform communication according to the feedback information transmission method in the embodiments of this application. The feedback information transmission method in the embodiments of this application may be performed by the terminal device or the transmission point, or a function module that can invoke and execute a program in the terminal device or the transmission point.

In addition, aspects or features of this application may be implemented as a method, an apparatus or a product that uses standard programming and/or engineering technologies. The term "product" used in this application covers a computer program that can be accessed from any computer readable component, carrier or medium. For example, the computer readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a communications system 100 for feedback information transmission according to this application. As shown in FIG. 1, the communications system 100 includes at least two transmission points 102 and at least one terminal device 104. Each transmission point 102 may include a plurality of antennas. In addition, the transmission point 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Each antenna (or an antenna group that includes a plurality of antennas) and/or an area that are/is designed for communication are/is referred to as a sector of the transmission point 102. For example, the antenna group may be designed to communicate with a terminal device in a sector in coverage of the transmission point 102. In a process in which the transmission point 102 communicates with the terminal device, a transmit antenna of the transmission point 102 can improve a signal-to-noise ratio of a communication link through beamforming. In addition, compared with a manner in which the transmission point 102 uses a single antenna to send signals to all terminal devices connected to the transmission point 102, the beamforming manner causes less interference to a mobile device in a neighboring cell when the transmission point 102 sends, through beamforming, signals to terminal devices that are randomly scattered in related coverage. In addition, in the embodiments of this application, the transmission point 102 may communicate with any quantity of terminal devices (for example, including a terminal device 104 described below).

The terminal device 104 may be, for example, a cellular phone, a smartphone, a portable computer, a handheld communications device, a handheld computing device, a satellite radio apparatus, a global positioning system, a PDA, and/or any other proper device configured to perform communication in the wireless communications system 100.

At a given time, the transmission point 102 and the terminal device 104 may be a wireless communication sending apparatus and/or a wireless communication receiving apparatus. When sending data, the wireless communication sending apparatus may encode the data for transmission. Further, the wireless communication sending apparatus may obtain (for example, generate, receive from another communications apparatus, or store in a memory) a specific quantity of data bits that need to be sent to the wireless communication receiving apparatus using a channel. The data bits may be included in a transport block (or a plurality of TBs) of data, and the transport block may be segmented to generate a plurality of code blocks.

In the embodiments of this application, the at least two transmission points 102 can send a plurality of pieces of data to the terminal device 104 using a same carrier.

As an example instead of a limitation, a coordinated multipoint multi-stream transmission technology may be enumerated as an implementation of the foregoing communication.

The following describes the coordinated multipoint multi-stream transmission technology.

Currently, a multiple-input multiple-output (MIMO) technology is widely applied.

The MIMO technology may also be referred to as a multi-antenna technology, and can improve system reliability through space diversity, increase a system capacity through spatial multiplexing, and improve cell coverage through beamforming. Therefore, the MIMO technology is considered as one of key technologies for implementing data transmission with a high rate and high quality in future mobile communication. As one of key technologies in an MIMO system, a precoding technology is applied to a transmit end, to minimize a correlation between signals on different transmit antennas when the signals arrive at a user (corresponding to space diversity), minimize interference between signals on different antennas when the signals arrive at a receive antenna (corresponding to spatial multiplexing), and maximize an array gain between a plurality of antennas (corresponding to beamforming).

CoMP is considered as an effective method for resolving an inter-cell interference problem and improving an edge user throughput. CoMP means that a plurality of geographically separated transmission points cooperate to transmit data such as a PDSCH of a terminal or jointly receive data such as a physical uplink shared channel (PUSCH) sent by a terminal.

Joint transmission (JT) is a typical transmission mode of CoMP. A plurality of transmission points simultaneously sends data to a same terminal device such that an interference signal is converted into a wanted signal, to improve communication quality of a link and improve a user throughput.

There are two existing joint transmission technologies. One is coherent JT, that is, a plurality of antennas from a plurality of different transmission points jointly performs precoding to transmit data to a terminal device, to implement space diversity or spatial multiplexing. The transmission is similar to conventional MIMO transmission, but the plurality of antennas used for MIMO transmission is distributed in different transmission points.

The other is non-coherent JT, that is, different transmission points transmit identical data to a same terminal device, and this is equivalent to power superposition of a plurality of signals on the terminal device side, to improve a receiving signal to interference plus noise ratio (SINR) of the terminal device.

The coordinated multipoint multi-stream transmission technology is an enhanced transmission technology based on existing CoMP non-coherent JT transmission. The coordinated multipoint multi-stream transmission technology may be considered as distributed MIMO, that is, a plurality of transmission points cooperatively transmit different data streams to a same terminal device on a same time-frequency resource. Each transmission point independently performs precoding and independently transmits different code blocks/data streams, to implement non-coherent distributed MIMO. Compared with coherent JT transmission, such non-coherent distributed MIMO has a low requirement for synchronization and is easy to implement. In addition, compared with conventional MIMO, in this transmission mode, more data streams/code blocks can be transmitted on a same time-frequency resource such that a user data transmission rate and a system throughput can be significantly improved.

Coordinated multipoint multi-stream transmission means that two or more transmission points separately perform precoding to transmit different data streams or different code blocks to a same terminal device. However, in existing CoMP joint transmission, different transmission points transmit a same data stream, or a plurality of transmission points jointly perform precoding to implement coherent joint transmission.

Therefore, as described above, the at least two transmission points 102 in the communications system 100 may belong to a same cell or different cells. In addition, data transmitted by the at least two transmission points 102 may include same data or different data. This is not limited in this application.

The embodiments of this application are applicable to both a homogeneous network scenario and a heterogeneous network scenario, and a transmission point is not limited. The embodiments of this application may be applied to CoMP between macro base stations, between micro base stations, and between a macro base station and a micro base station, and are applicable to both a frequency division duplex (FDD) system and a time division duplex (TDD) system.

It should be understood that a quantity of transmission points and a quantity of terminal devices included in the communications system 100 shown in FIG. 1 are merely examples for description, and this is not further limited in this application.

In addition, the communications system 100 may be a PLMN network, a device to device (D2D) network, an machine to machine (M2M) network, or another network. FIG. 1 is merely a simplified schematic diagram of an example. The network may further include another network device that is not shown in FIG. 1.

Optionally, a plurality of antenna ports corresponding to one base station may be quasi co-located or non-quasi co-located. One base station may include one transmission/reception (TRP) node or a plurality of transmission/reception nodes. For example, in a distributed MIMO system, because antenna ports corresponding to a same base station are located in different geographical locations, the same base station may include a plurality of transmission/reception nodes. Therefore, large-scale characteristics of antenna ports of different transmission/reception nodes of a same base station may be different, and the antenna ports corresponding to the different transmission/reception nodes of the same base station may also be non-quasi co-located. Different transmission points may be corresponding to a same base station.

Optionally, a large-scale array structure of a multi-antenna panel may be configured on a same transmission/reception node, and large-scale characteristics of different beams formed by different antenna panels are different. Therefore, antenna ports of a same transmission/reception node may be a quasi co-located or non-quasi co-located. Different transmission points may correspond to different panels of a same base station.

Optionally, a plurality of antenna ports corresponding to different base stations may be non-quasi co-located. Different transmission points may correspond to different base stations.

Optionally, antenna ports for sending by a transmission/reception node/a base station using different beams may also be non-quasi co-located. Different transmission points may correspond to different beams of a same transmission point.

Figure 2:
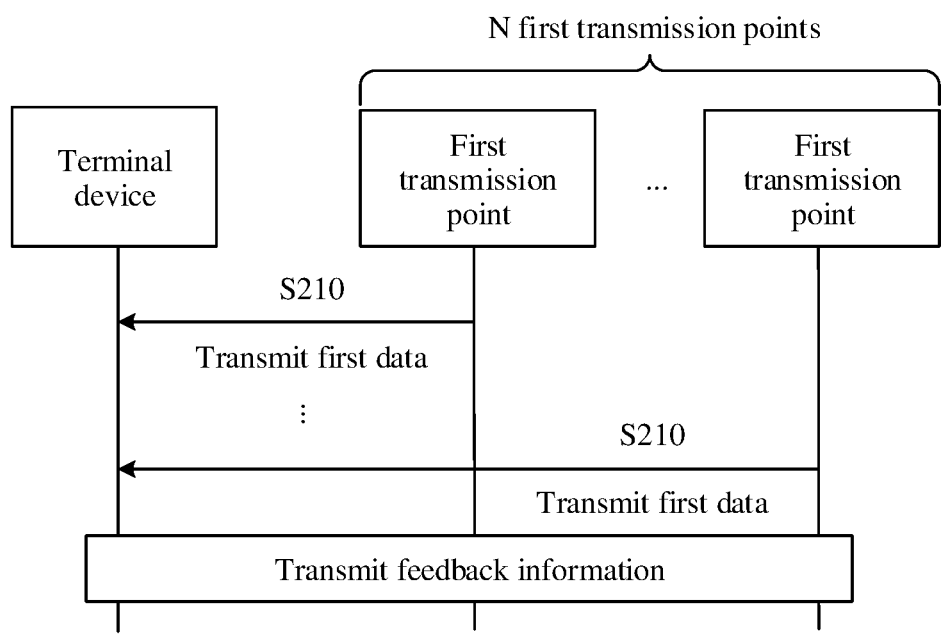
FIG. 2 is a schematic interaction diagram of a feedback information transmission method according to an embodiment of this application.

The following describes in detail a specific process of the feedback information transmission method in the embodiments of this application with reference to FIG. 2.

For ease of understanding and description, generally, a process in which a terminal device #A sends feedback information to N (N≥2) transmission points (an example of first transmission points) is used as an example below for description.

The feedback information is used to indicate a feedback result for different data streams from the N transmission points. The N transmission points may send N data streams (N pieces of first data) to the terminal device #A using a same carrier (a frequency domain resource with a specified width) and using, for example, a multipoint multi-stream transmission technology.

In addition, the N transmission points may include a home transmission point of the terminal device #A, or that is, a transmission point accessed by the terminal device #A. For ease of understanding, the transmission point is denoted as a serving transmission point #A (an example of a first serving transmission point) below, that is, a cell provided by the serving transmission point #A is used as a serving cell of the terminal device #A. In addition, a transmission point in the N transmission points except the serving transmission point #A is denoted as a coordinated transmission point (an example of a first coordinated transmission point).

FIG. 2 is a schematic interaction diagram of a feedback information transmission method according to an embodiment of this application. As shown in FIG. 2, the method includes the following steps.

S210. A terminal device receives M pieces of data (including the foregoing N pieces of first data) sent by M transmission points (including the foregoing N first transmission points), where M≥N.

It should be noted that, because the M transmission points perform coordinated transmission, the M pieces of data are sent in a same time unit.

As an example instead of a limitation, in this embodiment of this application, a time unit may be one subframe.

Alternatively, a time unit may be one slot.

Alternatively, a time unit may be one transmission time interval (TTI).

It should be understood that the foregoing enumerated specific instances of the time unit are merely examples for description, and this application is not limited thereto. Other division units in time domain that can be applied to wireless communication shall fall within the protection scope of this application. For example, a time unit may also include a specified quantity of symbols.

Then, the terminal device may determine feedback information of the M pieces of data based on receiving statuses of the M pieces of data, for example, a decoding status of received data.

As an example instead of a limitation, in this embodiment of this application, the feedback information may include acknowledgement (ACK) information or negative ACK (NACK) information in a hybrid automatic repeat request (HARM) technology.

In this embodiment of this application, the ACK information may indicate that the terminal device succeeds in decoding received data sent by a transmission point.

In addition, in this embodiment of this application, the NACK information may indicate that the terminal device receives no downlink data, or the terminal device fails to decode received data sent by a transmission point.

It should be understood that the foregoing enumerated content included in the feedback information is merely an example for description, and this application is not limited thereto. Other information that can indicate a status of receiving downlink data by the terminal device shall fall within the protection scope of this application. For example, the feedback information may further include discontinuous transmission (DTX) information, and the DTX information may be used to indicate that the terminal device receives no downlink data.

For ease of understanding and description, an example in which the feedback information includes ACK information or NACK information is used below to describe a transmission process of the feedback information in this application.

In this embodiment of this application, the terminal device may access only one transmission point (the foregoing serving transmission point #A), and in this case, the M transmission points may include only the foregoing N transmission points (that is, case 1, M=N). Alternatively, the terminal device may access only two or more transmission points (including the foregoing serving transmission point #A and a second transmission point described below), and in this case, the M transmission points include the foregoing N−1 coordinated transmission points and a plurality of serving transmission points (that is, case 2, M>N).

It should be noted that, in this embodiment of this application, a process in which the terminal device receives the M pieces of data from the M transmission points may be similar to that in the other approaches. To avoid repetition, detailed descriptions are omitted herein. For example, some or all transmission points (for example, the foregoing N transmission points) in the M transmission points may send data to the terminal device using, for example, a multipoint multi-stream transmission technology. For another example, some transmission points (for example, a plurality of transmission points accessed by the terminal device, or that is, a plurality of serving transmission points of the terminal device) in the M transmission points may send data to the terminal device using, for example, a carrier aggregation technology.

The following separately describes in detail the processing process in case 1 and case 2.

Case 1:

In case 1, the terminal device receives data (an example of the first data) from the foregoing serving transmission point #A and data (another example of the first data) from the N−1 coordinated transmission points.

In this embodiment of this application, downlink data transmission between a transmission point and the terminal device may be performed based on downlink control information (DCI), and the process and the method may be similar to those in the other approaches. To avoid repetition, detailed descriptions are omitted herein.

It should be noted that, in case 1A, the foregoing N pieces of first data may be transmitted based on N pieces of downlink control information, or in case 1B, the foregoing N pieces of first data may be transmitted based on one piece of downlink control information. The following separately describes in detail the feedback process in the foregoing cases.

Case 1A:

Optionally, the N pieces of first data are in a one-to-one correspondence with the N pieces of downlink control information, the N pieces of downlink control information are in a one-to-one correspondence with N downlink control channels, and each piece of downlink control information is carried on a corresponding downlink control channel. For any first transmission point Ti in the N first transmission points, the terminal device receives downlink control information T carried on a downlink control channel sent by the first transmission point Ti to the terminal device, and the downlink control information T is used to instruct the terminal device to receive first data Di sent by the first transmission point Ti.

Further, in this embodiment of this application, each of the N transmission points may use an independent downlink control channel, for example, a physical downlink control channel (PDCCH), or that is, each of the N transmission points may use independent downlink control information. In this case, the terminal device may receive, based on N PDCCHs (or that is, N pieces of DCI), the N pieces of first data sent by the N transmission points.

In the following, generally, the N pieces of first data are denoted as first data #1 to first data #N, and the N PDCCHs are denoted as a PDCCH #1 to a PDCCH #N. The PDCCH #1 may be used to transmit control information for controlling transmission of the first data #1, the PDCCH #2 may be used to transmit control information for controlling transmission of the first data #2, and by analogy, the PDCCH #N may be used to transmit control information for controlling transmission of the first data #N.

In this embodiment of this application, feedback information of the N pieces of first data may be transmitted in at least one of the following manners.

Manner 1:

Optionally, that the terminal device sends the feedback information of the N pieces of first data on at least one time-frequency resource includes the terminal device determines N time-frequency resource groups based on N downlink control channels, where the N downlink control channels are in a one-to-one correspondence with the N first transmission points, each time-frequency resource group includes at least one time-frequency resource used to transmit feedback information, and the N downlink control channels are in a one-to-one correspondence with the N time-frequency resource groups, and the terminal device sends the feedback information of the N pieces of first data on the N time-frequency resource groups, where the feedback information of the N pieces of first data is in a one-to-one correspondence with the N time-frequency resource groups.

In addition, that the first transmission point Ti receives feedback information of the first data Di includes that the first transmission point Ti determines a time-frequency resource group T in N time-frequency resource groups based on a downlink control channel T in N downlink control channels, where the N downlink control channels are in a one-to-one correspondence with the N first transmission points, each time-frequency resource group includes at least one time-frequency resource used to transmit feedback information, the N downlink control channels are in a one-to-one correspondence with the N time-frequency resource groups, and the feedback information of the N pieces of first data is in a one-to-one correspondence with the N time-frequency resource groups, and the first transmission point Ti receives the feedback information of the first data Di on the time-frequency resource group T.

Further, in manner 1, the feedback information of the N pieces of first data may be transmitted using the N time-frequency resource groups, and the time-frequency resource groups are determined in a similar manner. For ease of understanding and description, a process of determining a time-frequency resource group #A used to transmit feedback information #A of first data #A (an example of the first data) from a transmission point #A (an example of the first transmission point) is used as an example below for description.

It should be noted that, in this embodiment of this application, one time-frequency resource group may include one or more (for example, two) physical uplink control channel PUCCH) resources.

As an example instead of a limitation, the time-frequency resource group #A may be obtained using a preset function, and the time-frequency resource group #A is used to transmit the feedback information #A of the first data #A from the transmission point #A.

The preset function may be a function in which an index of a time-frequency resource occupied by a control channel such as a PDCCH used by the transmission point (for example, the transmission point #A) is used as an input parameter. It should be noted that, the index may also be an index of a first control channel element (CCE) of the PDCCH.

A PDCCH used by the transmission point #A is denoted as a PDCCH #A, and the PDCCH #A is used to transmit downlink control information #A. Therefore, the terminal device may receive the first data #A based on the downlink control information #A.

It should be understood that the foregoing enumerated PDCCH is merely an example of a control channel, and this is not further limited in this application. The control channel may also be an enhanced PDCCH (EPDCCH).

It should be noted that, if control information (or that is, scheduling information) of downlink data sent on an EPDCCH is used, the preset function may be a function in which a resource index of an EPDCCH used by the transmission point (for example, the transmission point #A) is used an input parameter. It should be noted that, the index of the EPDCCH may also be an index of a first enhanced CCE (ECCE) of the EPDCCH.

Similarly, the N time-frequency resource groups (denoted as a time-frequency resource group #1 to a time-frequency resource group #N) may be determined for the N pieces of first data (that is, the first data #1 to the first data #N). The time-frequency resource group #1 may be used to transmit feedback information of the first data #1, the time-frequency resource group #2 may be used to transmit feedback information of the first data #2, and by analogy, the time-frequency resource group #N may be used to transmit feedback information of the first data #N.

Therefore, in coordinated multipoint multi-stream transmission, the terminal device simultaneously receives a plurality of pieces of downlink data from a plurality of transmission points. The plurality of pieces of downlink data respectively correspond to a plurality of control channels (for example, PDCCHs or EPDCCHs), or that is, respectively correspond to a plurality of pieces of control information, and each control channel or each piece of control information corresponds to one PUCCH resource group (including one or two PUCCH resources). The terminal device sends, on a PUCCH group corresponding to each transmission point, feedback information corresponding to downlink data of the transmission point. The plurality of transmission points may include a serving transmission point (or that is, a serving cell) and a coordinated transmission point (or that is, a coordinated cell). Herein, the plurality of control channels or the plurality of pieces of control information may be sent by the serving transmission point (for example, the serving transmission point #A), or may be separately sent by the serving transmission point and each coordinated transmission point.

Therefore, in this embodiment of this application, each transmission point may determine, based on a control channel used by the transmission point, a time-frequency resource used to carry feedback information, and receive feedback information from the terminal device using the time-frequency resource.

It should be noted that, due to limitation of transmit power of the terminal device, a maximum of only two PUCCHs can be simultaneously transmitted in the current LTE specification. Therefore, in manner 1, feedback information of two transmission points (for example, one serving transmission point and one coordinated transmission point) can be transmitted. If a capability of the terminal device is further improved, more PUCCHs can be simultaneously transmitted. Therefore, in this embodiment of this application, feedback information of more transmission points (for example, one serving transmission point and a plurality of coordinated transmission points) can be transmitted. Descriptions of same or similar cases are omitted below.

Manner 2:

Optionally, that the terminal device sends the feedback information of the N pieces of first data using at least one time-frequency resource includes the terminal device determines a time-frequency resource group K from a plurality of time-frequency resources and a bit sequence L from a plurality of bit sequences based on the feedback information of the N pieces of first data and a preset first mapping relationship, where the first mapping relationship is used to indicate a mapping relationship between a plurality of first transmission resource combinations and a plurality of first feedback value combinations, each first transmission resource combination includes at least one of the plurality of time-frequency resources and at least one of the plurality of bit sequences, each first feedback value combination includes N groups of feedback values, a first transmission resource combination to which the time-frequency resource group K and the bit sequence L belong corresponds to a first feedback value combination to which a feedback value of the feedback information of the N pieces of first data belongs, each group of feedback values includes at least one feedback value, and each bit sequence includes at least two bits, and the terminal device sends the bit sequence L using the time-frequency resource group K.

In addition, that the first transmission point Ti receives feedback information of the first data Di includes that the first transmission point Ti receives, using a time-frequency resource group K in a plurality of time-frequency resources, a bit sequence L in a plurality of bit sequences sent by the terminal device, where each bit sequence includes at least two bits, the first transmission point Ti determines the feedback information of the N pieces of first data based on the time-frequency resource group K, the bit sequence L, and a preset first mapping relationship, where the first mapping relationship is used to indicate a mapping relationship between a plurality of first transmission resource combinations and a plurality of first feedback value combinations, each first transmission resource combination includes at least one of the plurality of time-frequency resources and at least one of the plurality of bit sequences, each first feedback value combination includes N groups of feedback values, a first transmission resource combination to which the time-frequency resource group K and the bit sequence L belong corresponds to a first feedback value combination to which a feedback value of the feedback information of the N pieces of first data belongs, and each group of feedback values includes at least one feedback value, and the first transmission point Ti determines the feedback information of the first data Di from the feedback information of the N pieces of first data.

Further, in this embodiment of this application, the terminal device may indicate the feedback information of the N pieces of first data using a combination of at least one time-frequency resource (an example of the time-frequency resource group K) and one bit sequence (an example of the bit sequence L).

There may be one time-frequency resource group K (that is, manner 2A), or there may be a plurality of time-frequency resource groups K (that is, manner 2B). The following separately describes in detail the feedback information transmission process in the foregoing two manners.

Manner 2A:

In this embodiment of this application, first data may be a transport block (TB), and each first transmission point sends a maximum of two TBs. That is, when there are N transmission points, the terminal device needs to feed back a maximum of 2N pieces (that is, 2N code words) of feedback information. As described above, each piece of feedback information may be an ACK or a NACK. Therefore, the 2N pieces of feedback information have $2^{2N}$ possible permutations and combinations.

As described above, the N transmission points may use N PDCCHs, and two time-frequency resources (for example, PUCCHs) that are used to transmit feedback information may be determined based on each PDCCH. That is, the terminal device and the first transmission point may determine 2N time-frequency resources (an example of the plurality of time-frequency resources and denoted as first candidate time-frequency resources below for ease of understanding and differentiation) that may be used to transmit feedback information, and each first candidate time-frequency resource may carry 2-bit information (namely, a bit sequence, where the bit sequence has 2×2 possible bit combinations). In this case, there are 2N×2×2=8N combinations of the foregoing determined 2N first candidate time-frequency resources and the bit sequence.

Optionally, the plurality of time-frequency resources include a time-frequency resource determined based on a downlink control channel.

Further, for example, when N=2 and $2^{2N}$=8N=16, the terminal device and the first transmission point may determine a one-to-one mapping relationship (an example of the first mapping relationship) between the $2^{2N}$ feedback information combinations and the 8N combinations of the first candidate time-frequency resources and the bit sequence.

It should be noted that, in this embodiment of this application, to improve communication reliability and accuracy, the first mapping relationship determined by the terminal device and the first transmission point is consistent. Further, for a same feedback information combination, a combination that is of a time-frequency resource and a bit sequence, indicated by the first mapping relationship stored in the terminal device and the first transmission point, and corresponding to the feedback information combination is the same. In addition, as an example instead of a limitation, in this embodiment of this application, the first mapping relationship may be determined by the first transmission point (for example, a serving transmission point of the terminal device, namely, the serving transmission point #A), and is delivered by the first transmission point to the terminal device. Alternatively, the first mapping relationship may be determined by the terminal device and the first transmission point through negotiation. Alternatively, the first mapping relationship may be determined by an operator and delivered by the operator to the terminal device and the first transmission point. Alternatively, the first mapping relationship may be stipulated in a communications protocol. To avoid repetition, descriptions of same or similar cases are omitted below.

As an example instead of a limitation, the following Table 1 shows an example of the first mapping relationship.

As described above, in this case, each transmission point sends a maximum of two TBs, that is, the terminal device needs to feed back a maximum of four pieces (further, four code words) of feedback information (an ACK or a NACK).

In the following, the two first transmission points are denoted as a serving transmission point #A and a coordinated transmission point #A, two TBs from the serving transmission point #A are denoted as a TB #1 and a TB #2, and two TBs from the coordinated transmission point #A are recorded as a TB #3 and a TB #4. Time-frequency resources (for example, PUCCHs) determined based on a PDCCH used by the serving transmission point #A are denoted as a PUCCH #1 and a PUCCH #2, and time-frequency resources (for example, PUCCHs) determined based on a PDCCH used by the coordinated transmission point #A are denoted as a PUCCH #3 and a PUCCH #4.

A mapping relationship (an example of the first mapping relationship) between a possible combination of four pieces of feedback information (feedback information of the TB #1 to the TB #4) and a combination of first candidate time-frequency resources (the PUCCH #1 to the PUCCH #4) and a bit sequence may be shown in the following Table 1.

It should be noted that, Table 1 is merely an example for description, and may be randomly changed based on an actual requirement. For example, a ranking order of the possible combination of the feedback information of the TB #1 to the TB #4 in Table 1 may be changed, or a ranking order of the combination of the first candidate time-frequency resources and the bit sequence may be changed.

resource) and a bit sequence (an example of a first bit sequence) and that is corresponding to the combination #1.

Therefore, in S210, the terminal device may transmit the bit sequence in the combination #2 using the time-frequency resource in the combination #2.

In addition, in this embodiment of this application, the first transmission point may perform blind detection on time-frequency resources (for example, the PUCCH #1 to the PUCCH #4) determined based on a PDCCH used by each first transmission point. Therefore, the first transmission point can determine a time-frequency resource (an example of the time-frequency resource group K) that carries a bit sequence (an example of the bit sequence L), and further determine the combination #1.

Then, the first transmission point may search the first mapping relationship (for example, the foregoing Table 1) for a feedback information combination (the combination #1) corresponding to the combination #2, and further determine the feedback information of the N pieces of first data.

Optionally, the plurality of time-frequency resources include a time-frequency resource determined based on a downlink control channel and a time-frequency resource indicated by second signaling received by the terminal device.

Alternatively, optionally, the plurality of time-frequency resources includes a time-frequency resource indicated by second signaling received by the terminal device.

Further, for another example, when N>2 and $2^{2N}>8N$, a quantity of combinations of first candidate time-frequency resources determined based on PDCCHs and a bit sequence is less than a quantity of feedback information combinations, and the combinations of the first candidate time-frequency resources and the bit sequence cannot correspond to all feedback information combinations.

In this case, the first transmission point (for example, the serving transmission point #A) may allocate a plurality of time-frequency resources (denoted as second candidate

TABLE 1

| Index | Feedback information of the TB #1 | Feedback information of the TB #2 | Feedback information of the TB #3 | Feedback information of the TB #4 | Time-frequency resource PUCCH | Bit sequence |
|---|---|---|---|---|---|---|
| 0 | ACK | ACK | ACK | ACK | PUCCH #1 | 1, 1 |
| 1 | ACK | ACK | ACK | NACK | PUCCH #1 | 1, 0 |
| 2 | ACK | ACK | NACK | ACK | PUCCH #1 | 0, 1 |
| 3 | ACK | ACK | NACK | NACK | PUCCH #1 | 0, 0 |
| 4 | ACK | NACK | ACK | ACK | PUCCH #2 | 1, 1 |
| 5 | ACK | NACK | ACK | NACK | PUCCH #2 | 1, 0 |
| 6 | ACK | NACK | NACK | ACK | PUCCH #2 | 0, 1 |
| 7 | ACK | NACK | NACK | NACK | PUCCH #2 | 0, 0 |
| 8 | NACK | ACK | ACK | ACK | PUCCH #3 | 1, 1 |
| 9 | NACK | ACK | ACK | NACK | PUCCH #3 | 1, 0 |
| 10 | NACK | ACK | NACK | ACK | PUCCH #3 | 0, 1 |
| 11 | NACK | ACK | NACK | NACK | PUCCH #3 | 0, 0 |
| 12 | NACK | NACK | ACK | ACK | PUCCH #4 | 1, 1 |
| 13 | NACK | NACK | ACK | NACK | PUCCH #4 | 1, 0 |
| 14 | NACK | NACK | NACK | ACK | PUCCH #4 | 0, 1 |
| 15 | NACK | NACK | NACK | NACK | PUCCH #4 | 1, 1 |

In this case, the terminal device may search, based on a combination (denoted as a combination #1 below for ease of understanding and description) of feedback information that currently needs to be transmitted, the first mapping relationship (for example, the foregoing Table 1) for a combination (denoted as a combination #2 below for ease of understanding and description) that is of a first candidate time-frequency resource (an example of a first time-frequency time-frequency resources below for ease of understanding and description) to the terminal device, and notify the terminal device of the second candidate time-frequency resources using signaling (an example of the first signaling) such that a quantity of combinations of the foregoing first candidate time-frequency resources (time-frequency resources determined based on a PDCCH used by the first transmission point), the second candidate time-frequency resources (time-frequency resources indicated based on the signaling), and the bit sequence is greater than or equal to a quantity ($2^{2N}$) of possible feedback information combinations.

Therefore, the terminal device and the first transmission point may determine a one-to-one mapping relationship (another example of the first mapping relationship) between the $2^{2N}$ feedback information combinations and $2^{2N}$ combinations of time-frequency resources and a bit sequence.

In this case, in addition to the first candidate time-frequency resources (the PUCCH #1 to the PUCCH #4), time-frequency resources shown in the foregoing Table 1 may include a second candidate time-frequency resource.

In this embodiment of this application, if a coordinating cluster includes more than two coordinated points (N>2), PDCCHs of N coordinated points correspond to 2N PUCCH resources, each resource may carry 2-bit information, and 8N pieces of ACK/NACK information combinations may be indicated. There are a total of $2^{2N}$ ACK/NACK information combinations. As N gradually increases, performing feedback on only one of the 2N PUCCH resources cannot cover all cases. Therefore, some PUCCH resources may be additionally configured using a higher layer, and the terminal device may indicate all cases of the $2^{2N}$ ACK/NACK information combinations by selecting different resources and adding carried 2-bit information.

It should be understood that the foregoing enumerated manner of determining a time-frequency resource in the first mapping relationship is merely an example for description, and this application is not limited thereto. For example, all time-frequency resources in the first mapping relationship may be time-frequency resources that are allocated by the first transmission point (for example, the serving transmission point #A) and that are indicated using signaling.

Manner 2B:

Different from manner 2A, in manner 2B, there are at least two time-frequency resource groups K. That is, the terminal device may transmit a bit sequence using at least two time-frequency resources.

The terminal device may transmit a bit sequence using X time-frequency resources, and each time-frequency resource may carry 2-bit (bit) information (namely, a bit sequence, where the bit sequence has $2^{2X}$ possible bit combinations). If there are Y (Y≥X) candidate time-frequency resources (including a first candidate time-frequency resource, or including a second candidate time-frequency resource, or including a first candidate time-frequency resource and a second candidate time-frequency resource), there are $C(Y, X) \times 2^{2X}$ combinations of X candidate time-frequency resources and the bit sequence.

Generally, a processing process in the case of N=3 and X=2 is used as an example for description.

In this case, there are $2^{2N}=64$ feedback information combinations.

The N transmission points may use N PDCCHs, and two time-frequency resources (for example, PUCCHs) that are used to transmit feedback information may be determined based on each PDCCH. That is, the terminal device and the first transmission point may determine 2N time-frequency resources (first candidate time-frequency resources) that may be used to transmit feedback information, and each first candidate time-frequency resource may carry 2-bit information (namely, a bit sequence).

In this case, there are $C(6, 2) \times 2^4=240$ combinations of the candidate time-frequency resources and the bit sequence.

In this case, the quantity of combinations of the candidate time-frequency resources and the bit sequence is greater than the quantity of feedback information combinations. In an actual design, four combinations may be selected from C(6, 2), that is, a mapping relationship table that can meet 64 types of feedback information.

Therefore, the terminal device and the first transmission point may determine 64 combinations from $C(6, 2) \times 2^{2x}=240$ combinations of the candidate time-frequency resources and the bit sequence, and determine a one-to-one mapping relationship (another example of the first mapping relationship) between the 64 feedback information combinations and $2^{2N}$ combinations of the candidate time-frequency resources and the bit sequence.

The terminal device may search, based on a combination (denoted as a combination #3 below for ease of understanding and description) of feedback information that currently needs to be transmitted, the first mapping relationship for a combination (denoted as a combination #4 below for ease of understanding and description) that is of X (for example, 2) time-frequency resources (another example of first time-frequency resources) and a bit sequence (an example of a first bit sequence) including 2X (for example, 4) bits and that is corresponding to the combination #3.

Therefore, in S210, the terminal device may transmit the bit sequence in the combination #4 using the X time-frequency resources in the combination #4.

In addition, in this embodiment of this application, the first transmission point may perform blind detection on Y time-frequency resources (for example, time-frequency resources determined based on a PDCCH used by each first transmission point and/or time-frequency resources determined based on signaling) such that the first transmission point can determine the X time-frequency resources (another example of first time-frequency resources) that carry a bit sequence (an example of the first bit sequence), and further determine the combination #4.

Then, the first transmission point may search the first mapping relationship for a feedback information combination (the combination #3) corresponding to the combination #4, and further determine the feedback information of the N pieces of first data.

Similar to manner 2A, in manner 2B, the Y time-frequency resources may include a time-frequency resource determined based on a downlink control channel and/or a time-frequency resource indicated by signaling (an example of second signaling).

As described above, in manner 2B, for example, when N=3, there are a maximum of six code words of ACK/NACK feedback information, and there are a total of $2^6=64$ combinations. There are six time-frequency resources (for example, PUCCHs) determined based on PDCCHs, there are $C(6, 2)=15$ possible cases if any two time-frequency resources are combined, and there are $2^4=16$ possible combinations of a bit sequence including four bits. In this case, there are 15×16 possible combinations of the time-frequency resources and the bit sequence, and 64 ACK/ACK combinations can be certainly indicated. The four bits may be ranked in ascending order of PUCCH resource indexes or may be ranked based on a preset agreement. For example, when 4-bit information "1011" is carried on a PUCCH #1 and a PUCCH #5, "10" is carried on the PUCCH #1, and "11" is carried on the PUCCH #5.

It should be noted that, manner 2A and manner 2B may be separately used or may be jointly used. This is not limited in this application. For example, a manner in which two bits are fed back using one PUCCH may be combined with a manner in which four bits are fed back using two PUCCHs. That is, if the feedback manner in which two bits are fed back based on one PUCCH is insufficient to meet feedback information combinations, the manner in which four bits are fed back using two PUCCHs may be used to feed back remaining feedback information combinations.

Manner 3:

Optionally, that the terminal device sends the feedback information of the N pieces of first data on at least one time-frequency resource includes the terminal device sends the feedback information of the N pieces of first data according to a first order on one time-frequency resource indicated by received third signaling, where the first order is a ranking order of the feedback information of the N pieces of first data on the one time-frequency resource.

In addition, that the first transmission point Ti receives feedback information of the first data Di includes the first transmission point Ti receives the feedback information of the N pieces of first data based on one time-frequency resource indicated by third signaling, where the feedback information of the N pieces of first data is sent by the terminal device according to a first order, and the first order is a ranking order of the feedback information of the N pieces of first data on the one time-frequency resource, and the first transmission point Ti determines the feedback information of the first data Di from the feedback information of the N pieces of first data according to the first order.

Further, in this embodiment of this application, the terminal device may simultaneously feed back the feedback information (for example, ACK/NACK information) of the N pieces of first data using a time-frequency resource (an example of the time-frequency resource indicated by the third signaling) specified by a PUCCH format 3/4.

A time-frequency resource used by the PUCCH format 3/format 4 is configured by the first transmission point (for example, the serving transmission point #A) using signaling (an example of the third signaling), and does not correspond to a start CCE of a PDCCH.

For example, for the PUCCH format 3, the first transmission point (for example, the serving transmission point #A) configures a resource of the PUCCH format 3 for the terminal device using 3PUCCH-AN-List-r10 and n3PUCCH-AN-ListP1-r10 format 3. When a quantity of transmission points (first transmission points) that participate in coordinated transmission is relatively large, the PUCCH format 3 may be selected to simultaneously feed back ACK/NACK information corresponding to a plurality of first transmission points. In this case, ACK/NACK information of a maximum of five first transmission points can be fed back. Certainly, feedback may also be performed for two transmission points using the PUCCH format 3. If a quantity (for example, more than five) of first transmission points is larger, the PUCCH format 4 may be further used to support feedback of a maximum of 22 bits of ACK/NACK information.

Case 1B:

Optionally, the N pieces of first data correspond to one piece of downlink control information, the one piece of downlink control information includes downlink data transmission information of the N first transmission points, one piece of first data is received by the terminal device based on downlink data transmission information that is in the downlink control information and that is of a first transmission point sending the one piece of first data, and the downlink control information is carried on one downlink control channel.

Further, in this embodiment of this application, each of the N transmission points may use a same downlink control channel such as a PDCCH. That is, in this embodiment of this application, a piece of downlink control information may include one piece of downlink control information, and the piece of downlink control information includes downlink data transmission information of the N transmission points. In this case, the terminal device may receive, based on N one PDCCH (or that is, one piece of DCI), the N pieces of first data sent by the N transmission points.

In this embodiment of this application, feedback information of the N pieces of first data may be transmitted in at least one of the following manners.

Manner 4:

Optionally, that the terminal device sends the feedback information of the N pieces of first data on at least one time-frequency resource includes the terminal device determines one time-frequency resource group based on one downlink control channel, where the one time-frequency resource group includes at least one time-frequency resource, and the one downlink control channel is used to transmit downlink data transmission information of the N first transmission points, and the terminal device sends the feedback information of the N pieces of first data on the one time-frequency resource group.

Further, in manner 4, in a scenario in which the terminal device accesses only one serving transmission point (or that is, a serving cell), the feedback information of the N pieces of first data may be transmitted using one time-frequency resource group.

It should be noted that, in manner 4, one piece of first data may be one transport block, that is, in manner 4, one first transmission point sends one transport block to the terminal device.

It should be noted that, in this embodiment of this application, the one time-frequency resource group may include one or more (for example, two) PUCCH resources.

As an example instead of a limitation, the one time-frequency resource group may be obtained using a preset function.

The preset function may be a function in which an index of a control channel such as a PDCCH used by the N first transmission points is used as an input parameter. It should be noted that, the index of the PDCCH may also be an index of a first CCE of the PDCCH.

It should be understood that the foregoing enumerated PDCCH is merely an example of a control channel, and this is not further limited in this application. The control channel may also be an EPDCCH.

It should be noted that, if control information (or scheduling information) of downlink data is sent using an EPDCCH, the preset function may be a function in which an index of the EPDCCH is used an input parameter. It should be noted that, the index of the EPDCCH may also be an index of a first ECCE of the EPDCCH.

Therefore, in coordinated multipoint multi-stream transmission, the terminal device simultaneously receives two pieces of downlink data from two transmission points. The two pieces of downlink data correspond to one control channel (for example, a PDCCH or an EPDCCH), or that is, correspond to one piece of control information, and the one control channel or the one piece of control information corresponds to one PUCCH resource group (including two or more PUCCH resources). The terminal device sends feedback information of one transmission point on one PUCCH resource in the PUCCH resource group and sends feedback information of the other transmission point on another PUCCH resource in the PUCCH resource group. The two transmission points may include a serving transmission point (or that is, a serving cell) and a coordinated transmission point (or that is, a coordinated cell). Herein, the one control channel or the one piece of control information may be sent by the serving transmission point (for example, the serving transmission point #A).

As described above, in manner 4, two first transmission points separately perform precoding on two pieces of data (two TBs), and send the two TBs obtained after precoding to the terminal device. Each first transmission point transmits one transport block. Based on a coordinated multipoint multi-stream transmission scheme in which a single downlink PDCCH corresponds to data transmission of two PDSCHs, scheduling information of the two first transmission points is combined, and when the combined scheduling information is sent by a first serving transmission point to the terminal using one piece of DCI information, a method for feeding back an ACK/a NACK for downlink transmission is as follows Because multipoint multi-stream transmission corresponds to only one PDCCH, the multipoint multi-stream transmission may correspond to one time-frequency resource group (including two PUCCH resources) based on the PDCCH, and feedback information of two TBs can be transmitted. When N=2, that is, a serving cell and a coordinated cell each transmit one TB, feedback information of one TB may be transmitted using one PUCCH resource in the one time-frequency resource group, and feedback information of the other TB is transmitted using the other PUCCH resource in the one time-frequency resource group. That is, the one time-frequency resource group can carry two bits, one bit corresponds to feedback information of one TB, and the other bit corresponds to feedback information of the other TB.

It should be noted that, in manner 4, the terminal device and the first transmission point may determine, through negotiation, a PUCCH resource that is in one time-frequency resource group and on which feedback information of each TB is carried, or that is, the terminal device and the first transmission point may determine a ranking order of two bits through negotiation. For example, a first bit is used to feed back ACK/NACK information of the first serving transmission point, and a second bit is used to feed back ACK/NACK information of a first coordinated transmission point.

Manner 5:

Further, in this embodiment of this application, the terminal device may indicate the feedback information of the N (N>3) pieces of first data (for example, a TB) using a combination of one time-frequency resource (an example of a first time-frequency resource) and one bit sequence (an example of a first bit sequence).

In manner 5, one piece of first data may be one TB, and each first transmission point sends one or more TBs. That is, when there are N TBs (from at least two first transmission points), the terminal device needs to feed back a maximum of N pieces (N code words) of feedback information. As described above, each piece of feedback information may be an ACK or a NACK. Therefore, the N pieces of feedback information have $2^N=8$ possible permutations and combinations.

As described above, the N transmission points may use one PDCCH, and one time-frequency resource group (including two time-frequency resources such as PUCCHs) that is used to transmit feedback information may be determined based on the one PDCCH. That is, the terminal device and the first transmission point may determine two time-frequency resources (denoted as third candidate time-frequency resources below for ease of understanding and differentiation) that may be used to transmit feedback information, and each third candidate time-frequency resource may carry 2-bit information (namely, a bit sequence, where the bit sequence has 2×2 possible bit combinations). In this case, there are 2×2×2=8 combinations of the foregoing determined two third candidate time-frequency resources and the bit sequence.

For example, when N=3 and $2^N=8$, the terminal device and the first transmission point may determine a one-to-one mapping relationship (another example of the first mapping relationship) between the $2^{2N}$ feedback information combinations and the eight combinations of the third candidate time-frequency resources and the bit sequence.

As an example instead of a limitation, the following Table 2 shows another example of the first mapping relationship.

As described above, in this case, each transmission point sends at least one TB, that is, the terminal device needs to feed back three pieces (three code words) of feedback information (an ACK or a NACK).

The three TBs are denoted as a TB #5, a TB #6, and a TB #7 below. Time-frequency resources (for example, PUCCHs) determined based on the one PDCCH are denoted as a PUCCH #5 and a PUCCH #6.

A mapping relationship (an example of the first mapping relationship) between a possible combination of the foregoing three pieces of feedback information (feedback information of the TB #5 to the TB #7) and a combination of third candidate time-frequency resources (the PUCCH #5 and the PUCCH #6) and a bit sequence may be shown in the following Table 2.

It should be noted that, Table 2 is merely an example for description, and may be randomly changed based on an actual requirement. For example, a ranking order of the possible combination of the feedback information of the TB #5 to the TB #7 in Table 2 may be changed, or a ranking order of the combination of the third candidate time-frequency resources and the bit sequence may be changed.

TABLE 2

| Index | TB #5 | TB #6 | TB #7 | Time-frequency resource PUCCH | Bit sequence |
|---|---|---|---|---|---|
| 0 | ACK | ACK | ACK | PUCCH #5 | 1, 1 |
| 1 | ACK | NACK | ACK | PUCCH #5 | 1, 0 |
| 2 | NACK | ACK | ACK | PUCCH #5 | 0, 1 |
| 3 | NACK | NACK | ACK | PUCCH #5 | 0, 0 |
| 4 | ACK | ACK | NACK | PUCCH #6 | 1, 1 |
| 5 | ACK | NACK | NACK | PUCCH #6 | 1, 0 |
| 6 | NACK | ACK | NACK | PUCCH #6 | 0, 1 |
| 7 | NACK | NACK | NACK | PUCCH #6 | 0, 0 |

In this case, the terminal device may search, based on a combination (denoted as a combination #5 below for ease of understanding and description) of feedback information that currently needs to be transmitted, the first mapping relationship (for example, the foregoing Table 2) for a combination (denoted as a combination #6 below for ease of understanding and description) that is of a third candidate time-frequency resource (an example of a time-frequency resource group K) and a bit sequence (an example of a bit sequence L) and that is corresponding to the combination #5.

Therefore, in S210, the terminal device may transmit the bit sequence in the combination #6 using the time-frequency resource in the combination #6.

In addition, in this embodiment of this application, the first transmission point may perform blind detection on time-frequency resources (for example, the PUCCH #5 and the PUCCH #6) determined based on a PDCCH. Therefore, the first transmission point can determine a time-frequency resource (an example of the time-frequency resource group K) that carries a bit sequence (an example of the bit sequence L), and further determine the combination #6.

Then, the first transmission point may search the first mapping relationship (for example, the foregoing Table 2) for a feedback information combination (the combination #5) corresponding to the combination #6, and further determine the feedback information of the N pieces of first data.

For another example, when N>3 and $2^N$>8, a quantity of combinations of a bit sequence and third candidate time-frequency resources determined based on a PDCCH is less than a quantity of feedback information combinations, and the combinations of the third candidate time-frequency resources and the bit sequence cannot correspond to all feedback information combinations.

In this case, the first transmission point (for example, the serving transmission point #A) may allocate a plurality of time-frequency resources (denoted as fourth candidate time-frequency resources below for ease of understanding and description) to the terminal device, and notify the terminal device of the fourth candidate time-frequency resources using signaling (an example of second signaling) such that a quantity of combinations of the foregoing third candidate time-frequency resources (time-frequency resources determined based on a PDCCH used by the first transmission point), the fourth candidate time-frequency resources (time-frequency resources indicated based on the signaling), and the bit sequence is greater than or equal to a quantity ($2^N$) of possible feedback information combinations.

Therefore, the terminal device and the first transmission point may determine a one-to-one mapping relationship (another example of the first mapping relationship) between the $2^N$ feedback information combinations and $2^N$ combinations of time-frequency resources and a bit sequence.

In this case, in addition to the third candidate time-frequency resources (the PUCCH #5 and the PUCCH #6), time-frequency resources shown in the foregoing Table 2 may include a fourth candidate time-frequency resource.

In this embodiment of this application, if a coordinating cluster includes more than three coordinated points (that is, a quantity of TBs is greater than 3), a PDCCH of N coordinated points corresponds to two PUCCH resources, each resource may carry 2-bit information, and eight pieces of ACK/NACK information combinations may be indicated. There are a total of $2^N$ ACK/NACK information combinations. As N gradually increases, performing feedback on only one of the two PUCCH resources cannot cover all cases. Therefore, some PUCCH resources may be additionally configured using a higher layer, and the terminal device may indicate all cases of the $2^N$ ACK/NACK information combinations by selecting different resources and adding carried 2-bit information.

It should be understood that the foregoing enumerated manner of determining a time-frequency resource in the first mapping relationship is merely an example for description, and this application is not limited thereto. For example, all time-frequency resources in the first mapping relationship may be time-frequency resources that are allocated by the first transmission point (for example, the serving transmission point #A) and that are indicated using signaling.

Manner 6:

Further, in this embodiment of this application, the terminal device may simultaneously feed back the feedback information (for example, ACK/NACK information) of the N pieces of first data using a time-frequency resource specified by a PUCCH format 3/4.

A time-frequency resource used by the PUCCH format 3/format 4 is configured by the first transmission point (for example, the serving transmission point #A) using signaling (an example of third signaling), and does not correspond to a start CCE of a PDCCH.

For example, for the PUCCH format 3, the first transmission point (for example, the serving transmission point #A) configures a resource of the PUCCH format 3 for the terminal device using 3PUCCH-AN-List-r10 and n3PUCCH-AN-ListP1-r10 format 3. When a quantity of transmission points (first transmission points) that participate in coordinated transmission is relatively large, the PUCCH format 3 may be selected to simultaneously feed back ACK/NACK information corresponding to a plurality of first transmission points. In this case, ACK/NACK information of a maximum of five first transmission points can be fed back. Certainly, feedback may also be performed for two transmission points using the PUCCH format 3. If a quantity (for example, more than five) of first transmission points is larger, the PUCCH format 4 may be further used to support feedback of a maximum of 22 bits of ACK/NACK information.

In addition, in this embodiment of this application, the feedback information of the N pieces of first data may be sent by the terminal device according to a first order, and therefore each first transmission point may determine, according to the first order, a location of feedback information to be received by each first transmission point in the N pieces of feedback information.

As an example instead of a limitation, in this embodiment of this application, the first order may be performing ranking in ascending order or descending order of transmission point indexes.

Optionally, indication information of the first order is preconfigured in the terminal device, or the method further includes receiving, by the terminal device, fourth signaling, where the signaling is used to indicate the first order.

Further, in this embodiment of this application, the first order may be specified in a communications system or a communications protocol, or the first order may be preset by a manufacturer or a network operator in the terminal device and a transmission point, or the first order may be determined by the terminal device and a transmission point through negotiation. For example, the first order may be determined by a transmission point (for example, a serving transmission point), and is indicated by the transmission point to the terminal device using signaling (an example of the fourth signaling).

Optionally, the first order may be determined in an implicit manner.

As an example instead of a limitation, in this embodiment of this application, the first order may be determined in at least one of the following manners.

Manner a:

For example, in this embodiment of this application, the first order may be determined based on related information of an antenna port group of a demodulation reference signal (DMRS) corresponding to at least one of the N pieces of first data.

It should be noted that, "a demodulation reference signal corresponding to first data" herein may be a DMRS used to demodulate the first data.

Optionally, for example, control information (for example, DCI) used to control transmission of first data may include information (denoted as information #α below for ease of understanding and description) used to determine a DMRS antenna port group corresponding to the first data such that the first order can be determined based on the DMRS antenna port group.

As an example instead of a limitation, the information #α may be information for directly indicating the DMRS antenna port group.

Alternatively, the information #α may be information for indirectly indicating the DMRS antenna port group.

For example, in this embodiment of this application, the information #α may be used to indicate a parameter #α, and information about the DMRS antenna port group can be determined based on the parameter #α.

As an example instead of a limitation, the parameter #α may be enumerated as quasi co-location information of a DMRS antenna port.

Quasi Co-Located (QCL) may mean that if two antenna ports are quasi co-located, it indicates that a channel characteristic on a symbol sent using one antenna port may be deduced using a channel characteristic on a symbol sent using the other antenna port.

A quasi co-location parameter of an antenna port may include but is not limited to at least one of an average gain, an average delay, a delay spread, a Doppler shift, a Doppler spread, and a spatial reception parameter.

The spatial reception parameter may be expressed as a spatial channel characteristic of an antenna port obtained at a receive end.

Optionally, the spatial reception parameter may be further expressed as one or more of the following parameters:

An angle of arrival (AoA);
A dominant AoA;
An average AOA;
An angle of arrival spread (AAS);
An angle of departure (AoD);
An angle of departure spread (ADS);
A spatial correlation;
Power angular spectrum of an angle of arrival (PAS of AoA);
An average angle of departure;
Power spectral density of an angle of departure (PAS of AoD);
A transmit/receive channel correlation;
A transmit/receive beam; and
A spatial channel correlation.

Optionally, a plurality of antenna ports corresponding to one base station may be quasi co-located or non-quasi co-located. One base station may include one TRP node or a plurality of transmission/reception nodes. For example, in a distributed MIMO system, because antenna ports corresponding to a same base station are located in different geographical locations, the same base station may include a plurality of transmission/reception nodes. Therefore, large-scale characteristics of antenna ports of different transmission/reception nodes of a same base station may be different, and the antenna ports corresponding to the different transmission/reception nodes of the same base station may also be non-quasi co-located. Different transmission points may be different transmission points corresponding to a same base station.

Optionally, a large-scale array structure of a multi-antenna panel may be configured on a same transmission/reception node, and large-scale characteristics of different beams formed by different antenna panels are different. Therefore, antenna ports of a same transmission/reception node may be a quasi co-located or non-quasi co-located. Different transmission points may correspond to different panels of a same base station.

Optionally, a plurality of antenna ports corresponding to different base stations may be non-quasi co-located. Different transmission points may correspond to different base stations.

Optionally, antenna ports for sending by a transmission/reception node/a base station using different beams may also be non-quasi co-located. Different transmission points may correspond to different beams of a same transmission point.

For example, in this embodiment of this application, there may be a mapping relationship between a plurality of pieces of quasi co-location indication information and a plurality of DMRS antenna port groups. For example, quasi co-location indication information 1 sent by a first transmission point may correspond to a DMRS antenna port group 1, and quasi co-location indication information 2 sent by a second transmission point may correspond to a DMRS antenna port group 2.

Therefore, the terminal device can determine a DMRS antenna port based on received control information and the mapping relationship.

Alternatively, in this embodiment of this application, quasi co-location indication information may carry indication information of a DMRS antenna port group.

For example, a first transmission point sends quasi co-location indication information 1 of a DMRS antenna port, and determines information about a DMRS antenna port group according to the quasi co-location indication information. The information about the DMRS antenna port group may be indicated according to the quasi co-location indication information. For example, a DMRS antenna port group 1 is indicated in the quasi co-location indication information 1.

For another example, a second transmission point sends quasi co-location indication information 2 of a DMRS antenna port, and determines information about a DMRS antenna port group according to the quasi co-location indication information. The information about the DMRS antenna port group may be indicated according to the quasi co-location indication information. For example, a DMRS antenna port group 2 is indicated in the quasi co-location indication information 2.

Therefore, as described above, a DMRS antenna port group corresponding to one or more pieces of first data can be determined.

Then, the first order may be determined based on the DMRS antenna port group corresponding to the one or more pieces of first data.

Further, for example, a quantity of antenna port groups is set to 2. The first transmission point sends control information 1, and the control information 1 indicates the DMRS antenna port group 1. The second transmission point sends control information 2, and the control information 2 indicates the DMRS antenna port group 2. In this case, the terminal determines the first order based on information about a DMRS antenna port group.

For example, the first order is determined based on an index number of a DMRS antenna port group. For example, feedback information of first data corresponding to a DMRS antenna port group with a smaller group number may be ranked in front of feedback information of first data corresponding to a DMRS antenna port group with a larger group number. That is, ACK/NACK information of first data corresponding to the DMRS antenna port group 1 is ranked in front of ACK/NACK information of first data corresponding to the DMRS antenna port group 2.

It should be understood that the foregoing enumerated specific instance of the first order is merely an example for description, and this application is not limited thereto. Other ranking orders may also be applied to this embodiment of this application. This is not further limited herein.

Manner b:

Optionally, for example, the first order may be determined based on related information of a code word corresponding to at least one of the N pieces of first data.

It should be noted that, "a code word corresponding to first data" herein may be a code word used for encoding the first data.

Optionally, in this embodiment of this application, control information (for example, DCI) of first data may include indication information of a code word corresponding to the first data.

Further, for example, a first transmission point sends control information 1, and the control information 1 includes code word indication information 1, a second transmission point sends control information 2, and the control information 2 includes code word indication information 2. In this case, the terminal determines the first order according to code word indication information. For example, the first order is determined based on a number of code word indication information. For example, code word indication information with a smaller number may be ranked in front of code word indication information with a larger number. For example, ACK/NACK information of first data corresponding to the code word indication information 1 is ranked in front of ACK/NACK information of first data corresponding to the code word indication information 2. Other ranking orders may also be applied to this embodiment of this application. This is not further limited herein.

Manner c

Optionally, for example, the first order may be determined based on related information of a transmission point corresponding to at least one of the N pieces of first data.

It should be noted that, "a transmission point corresponding to first data" herein may be a transmission point sending the first data.

Further, for example, a first transmission point sends control information 1, and the control information 1 indicates transmission point identification information 1, a second transmission point sends control information 2, and the control information 2 indicates transmission point identification information 2. In this case, the terminal determines the first order based on transmission point identification information. For example, the first order is determined based on a number of transmission point identification information. For example, transmission point identification information with a smaller number may be ranked in front of transmission point identification information with a larger number. For example, ACK/NACK information of first data corresponding to the transmission point identification information 1 is ranked in front of ACK/NACK information of first data corresponding to the transmission point identification information 2. Other ranking orders may also be applied to this embodiment of this application. This is not further limited herein.

Manner d:

Optionally, for example, the first order may be determined based on a number of a resource set used for transmitting downlink data transmission information corresponding to at least one of the N pieces of first data.

Further, for example, control information of first data transmitted by a first transmission point is transmitted on a resource corresponding to a control channel resource set numbered 1, and control information of first data transmitted by a second transmission point is transmitted on a resource corresponding to a control channel resource set numbered 2. In this case, the terminal determines the first order based on a number of a control channel resource set in which detected control information is located.

As an example instead of a limitation, for example, if the terminal detects control information 1 from the control channel resource set numbered 1 and detects control information 2 from the control channel resource set numbered 2, the terminal determines that ACK/NACK information of first data corresponding to the control information 1 is ranked in front of ACK/NACK information of first data corresponding to the control information 2. Other ranking orders may also be applied to this embodiment of this application. This is not further limited herein.

It should be noted that, in this embodiment of this application, the "resource set" may include a control resource set (CORESET).

A CORESET is a set of time-frequency resources used to transmit a control channel. The CORESET may include a time domain resource (for example, control channel symbol information) and/or a frequency domain resource (for example, a physical resource block (RB) occupied by a control channel).

A physical control channel candidate may also be referred to as a candidate (candidate) for short. At an aggregation level, one PDCCH may be transmitted in a plurality of physical control channel candidates. The candidate resource may be related to the aggregation level, and the aggregation level may be that one PDCCH is transmitted using several CCE, or is carried on several CCE resources.

A CCE is a basic unit of a control channel resource, and the CCE may include one or more resource element groups (REG).

Optionally, search space may include one or more PDCCH candidate resources. The search space may be a set of candidate resources at an aggregation level.

Manner e:

Optionally, for example, the first order may be determined based on a location (for example, a frequency domain location or a time domain location) of a resource set used for transmitting downlink data transmission information corresponding to at least one of the N pieces of first data.

"A location of a resource set" herein may be a location of a control channel resource set.

Further, for example, control information of first data transmitted by a first transmission point is transmitted on resources corresponding to frequency domain numbers A and B in a location of a control channel resource set, and control information of first data transmitted by a second transmission point is transmitted on resources corresponding to frequency domain numbers C and D in a location of a control channel resource set. In this case, the terminal determines the first order based on a location of a control channel resource set in which detected control information is located.

For example, the terminal detects control information 1 on the resources corresponding to the frequency domain numbers A and B of the control channel resource set and detects control information 2 on the resources corresponding to the frequency domain numbers C and D of the control channel resource set. For example, if A<B<C<D, the terminal determines that ACK/NACK information of first data corresponding to the control information 1 is ranked in front of ACK/NACK information of first data corresponding to the control information 2. Other ranking orders may also be applied to this embodiment of this application. This is not further limited herein.

Alternatively, "a location of a resource set" may be a candidate control channel location.

Further, control information of first data transmitted by a first transmission point is transmitted on a resource corresponding to a candidate control channel location 1, and control information of first data transmitted by a second transmission point is transmitted on a resource corresponding to a candidate control channel location 2. In this case, the terminal determines the first order based on a candidate control channel location in which detected control information is located.

For example, if the terminal detects control information 1 on the resource corresponding to the candidate control channel location 1 and detects control information 2 on the resource corresponding to the candidate control channel location 2, the terminal determines that ACK/NACK information of first data corresponding to the control information 1 is ranked in front of ACK/NACK information of first data corresponding to the control information 2. Other ranking orders may also be applied to this embodiment of this application. This is not limited herein.

Manner f:

Optionally, for example, the first order may be determined based on a number of a control channel element used for transmitting downlink data transmission information corresponding to at least one of the N pieces of first data.

Further, for example, control information of first data transmitted by a first transmission point is transmitted on resources corresponding to control channel element numbers E and F, and control information of first data transmitted by a second transmission point is transmitted on resources corresponding to control channel element numbers G and H. In this case, the terminal determines the first order based on a number of a control channel element in which detected control information is located. In this case, the terminal determines the first order based on a number of a control channel element in which detected control information is located.

Further, for example, the terminal detects control information 1 on the resources corresponding to the control channel element numbers E and F, and detects control information 2 on the resources corresponding to the control channel element numbers G and H. For example, if E<G, the terminal determines that ACK/NACK information of first data corresponding to the control information 1 is ranked in front of ACK/NACK information of first data corresponding to the control information 2. Other ranking orders may also be applied to this embodiment of this application. This is not further limited herein.

Manner g:

Optionally, for example, the first order may be determined based on configuration information of a control channel resource set used for transmitting downlink data transmission information corresponding to at least one of the N pieces of first data.

Further, for example, the configuration information of the control channel resource set indicates an ACK/NACK feedback order. The terminal may determine, based on the configuration information of the control channel resource set, an ACK/NACK feedback order of data corresponding to control information detected in the control channel resource set.

For example, when the configuration information of the control channel resource set indicates that ACK/NACK feedback ranks higher, the terminal may determine that ACK/NACK feedback of first data corresponding to the control information detected in the control channel resource set ranks higher. For example, when the configuration information of the control channel resource set indicates that ACK/NACK feedback ranks lower, the terminal may determine that ACK/NACK feedback of first data corresponding to the control information detected in the control channel resource set ranks lower. Other ranking orders may also be applied to this embodiment of this application. This is not limited herein.

Optionally, the first order may be determined based on another characteristic of control information of first data, and this is not limited herein. The other characteristic of the control information may be a candidate location in which the control information is located, a location of a CCE, or the like.

The control information in this application may be downlink data transmission information or other information. This is not limited herein.

It should be understood that the foregoing enumerated methods and processes of determining the first order are merely examples for description, and this application is not limited thereto. Another method for determining the first order may also be applied to this embodiment of this application.

Therefore, transmission of the feedback information of the N first transmission points can be completed in manner 1 to manner 6.

Optionally, the method further includes the terminal device receives fifth signaling, where the fifth signaling is used to indicate a target feedback manner in a plurality of feedback manners, and the target feedback manner is a feedback manner of the feedback information of the N pieces of first data.

That the terminal device sends the feedback information of the N pieces of first data using at least one time-frequency resource includes the terminal device sends the feedback information of the N pieces of first data using the at least one time-frequency resource in the target feedback manner indicated by the fifth signaling.

In addition, that the first transmission point Ti receives feedback information of the first data Di includes the first transmission point Ti determines a target feedback manner from a plurality of feedback manners, where the target feedback manner is a manner that is indicated by fifth signaling and that is of sending the feedback information of the N pieces of first data by the terminal device, and the first transmission point Ti receives the feedback information of the first data Di in the target feedback manner.

Further, in this embodiment of this application, as described above, for example, the terminal device may directly report feedback information using a PUCCH resource corresponding to a start CCE index of a PDCCH.

For another example, the terminal device may perform feedback using a combination of a PUCCH resource and a bit sequence.

For another example, the terminal device may perform reporting using a higher-layer configuration resource in a format such as a PUCCH format 3.

In this case, a serving transmission point explicitly indicates, using signaling (an example of the fifth signaling), a manner currently to be used by the terminal device to perform ACK/NACK feedback.

That is, a specific feedback manner used by the terminal device needs to be indicated using signaling, and the following provides a possible indication manner of signaling configuration:

```
PUCCH-ConfigDedicated-v1610 ::=                SEQUENCE {
    pucch-Format-r14                           CHOICE {
        format3-r14
            SEQUENCE {
                n3PUCCH-AN-List-r14        SEQUENCE (SIZE (1..4)) OF
INTEGER (0..549)    OPTIONAL,    -- Need ON
                twoAntennaPortActivatedPUCCH-Format3-r14
            CHOICE {
                                release
                NULL,
                                setup
                SEQUENCE {
                            n3PUCCH-AN-ListP1-r14    SEQUENCE (SIZE
(1..4)) OF INTEGER (0..549)
                }
            }                     OPTIONAL    -- Need ON
        },
        channelselection-r14                   SEQUENCE {
                n1PUCCH-AN-CS-r14
            CHOICE {
                                release
                NULL,
                                setup
                SEQUENCE {
                            n1PUCCH-AN-CS-List-r14
                    SEQUENCE (SIZE (1..2)) OF N1PUCCH-AN-CS-r10
                }
            }
                                  OPTIONAL    -- Need ON
        }
    }                             OPTIONAL,    -- Need OR
    twoAntennaPortActivatedPUCCH-Format1a1b-r14         ENUMERATED
{true}   OPTIONAL,    -- Need OR
    simultaneousPUCCH-PUSCH-r14
    ENUMERATED {true}             OPTIONAL,  -- Need OR
        n1PUCCH-AN-RepP1-r14
    INTEGER (0..2047)             OPTIONAL   -- Need OR
}
N1PUCCH-AN-CS-r14    ::= SEQUENCE (SIZE (1..4)) OF INTEGER (0..2047)
```

When a quantity of combinations of a bit sequence and resources included in a PUCCH resource group corresponding to a start CCE index of a PDCCH is greater than or equal to a quantity of feedback information combinations, configuration of n1PUCCH-AN-CS-List-r14 is not required. Configuration needs to be performed only when a quantity of PUCCH resources is insufficient and PUCCH resources need to be additionally configured for UE using signaling.

Case 2:

Optionally, the N first transmission points include a first serving transmission point and N−1 first coordinated transmission points of the terminal device, and the method further includes that the terminal device receives second data sent by a second transmission point, where the first data and the second data are carried on different carriers.

That the terminal device sends the feedback information of the N pieces of first data using at least one time-frequency resource includes that the terminal device sends feedback information of first data of the N−1 first coordinated transmission points, feedback information of first data of the first serving transmission point, and feedback information of the second data using the at least one time-frequency resource.

Further, in case 2, the terminal device can access two serving transmission points (denoted as a serving transmission point #A and a serving transmission point #B below for ease of understanding and differentiation). In this case, the serving transmission point #A (an example of the first serving transmission point) and the serving transmission point #B (an example of the second transmission point) may send data to the terminal device using, for example, a carrier aggregation (CA) technology. Further, the serving transmission point #A and the serving transmission point #B may send different data to the terminal device using different carriers.

Optionally, the terminal device receives data (an example of the first data) from the serving transmission point #A, data (another example of the first data) from the N−1 coordinated transmission points, and data (an example of the second data) from the serving transmission point #B.

That the terminal device sends feedback information of first data of the N−1 first coordinated transmission points, feedback information of first data of the first serving transmission point, and feedback information of the second data using the at least one time-frequency resource includes the terminal device sends the feedback information of the first data of the N−1 first coordinated transmission points using at least one first time-frequency resource, and sends the feedback information of the first data of the first serving transmission point and the feedback information of the second data using at least one second time-frequency resource, or the terminal device sends the feedback information of the first data of the N−1 first coordinated transmission points and the feedback information of the first data of the first serving transmission point using at least one first time-frequency resource, and sends the feedback information of the second data using at least one second time-frequency resource.

Further, feedback information of the data (an example of the second data) from the serving transmission point #B may be separately transmitted (for example, using a second time-frequency resource). For example, the second time-frequency resource may be determined based on a control channel (for example, a PDCCH) or control information (for example, DCI) used by the serving transmission point #A, or may be indicated based on signaling. This is not further limited in this application. Feedback information of the data from the serving transmission point #A (an example of the first data of the first serving transmission point) and feedback information of the data from the N−1 coordinated transmission points may be jointly transmitted, for example, using a first time-frequency resource. In addition, the process may be similar to the process described in case 1.

Alternatively, a process of transmitting feedback information of the data from the serving transmission point #A (an example of the first data of the first serving transmission point) and feedback information of the data (an example of the second data) from the serving transmission point #B may be similar to that in the other approaches. For example, the feedback information of the data from the serving transmission point #A and the feedback information of the data from the serving transmission point #B may be carried on a same time-frequency resource (an example of a second time-frequency resource) for transmission. In addition, for example, the second time-frequency resource may be determined based on a control channel (for example, a PDCCH) or control information (for example, DCI) used by the serving transmission point #A, or may be indicated based on signaling. This is not further limited in this application. Feedback information of the data from the N−1 coordinated transmission points may be separately transmitted, for example, using a first time-frequency resource.

The following mainly describes in detail a process of transmitting the feedback information of the data from the N−1 coordinated transmission points.

In this embodiment of this application, the N pieces of first data (including the first data of the N−1 coordinated transmission points) and downlink data of the terminal device may be transmitted based on DCI, and the process and the method may be similar to those in the other approaches. To avoid repetition, detailed descriptions are omitted herein.

It should be noted that, in case 2A, the N pieces of first data (including the first data of the N−1 coordinated transmission points) may be transmitted based on N pieces of downlink control information, or in case 2B, the N pieces of first data (including the first data of the N−1 coordinated transmission points) may be transmitted based on one piece of downlink control information. The following separately describes in detail the feedback process in the foregoing cases.

Case 2A:

Optionally, the N pieces of first data are in a one-to-one correspondence with N pieces of downlink control information, and the N pieces of downlink control information are in a one-to-one correspondence with N downlink control channels.

Further, in this embodiment of this application, each of the N transmission points may use an independent downlink control channel such as a PDCCH, or that is, each of the N transmission points may use independent downlink control information such as DCI. In this case, the terminal device may receive, based on N PDCCHs (or that is, N pieces of DCI), the N pieces of first data sent by the N transmission points.

In the following, generally, the N pieces of first data are denoted as first data #1 to first data #N, and the N PDCCHs are denoted as a PDCCH #1 to a PDCCH #N. The PDCCH #1 may be used to transmit control information for controlling transmission of the first data #1, the PDCCH #2 may be used to transmit control information for controlling transmission of the first data #2, and by analogy, the PDCCH #N may be used to transmit control information for controlling transmission of the first data #N.

Generally, it is assumed that the first data #1 is the first data of the first serving transmission point (for example, the data of the serving transmission point #A), the first data #2 to the first data #N are the first data of the N−1 first coordinated transmission points, the PDCCH #1 is a PDCCH used by the serving transmission point #A, and the PDCCH #2 to the PDCCH #N are PDCCHs used by the N−1 first coordinated transmission points.

In this embodiment of this application, feedback information of the N pieces of first data may be transmitted in at least one of the following manners.

Manner 7:

Optionally, that the terminal device sends the feedback information of the N pieces of first data using at least one time-frequency resource includes the terminal device determines N−1 time-frequency resource groups based on N−1 downlink control channels used by the N−1 first coordinated transmission points, where each time-frequency resource group includes at least one time-frequency resource used to transmit feedback information, and the N−1 downlink control channels are in a one-to-one correspondence with the N−1 time-frequency resource groups, and the terminal device sends the feedback information of the first data of the N−1 first coordinated transmission points using the N−1 time-frequency resource groups, where the feedback information of the first data of the N−1 first coordinated transmission points is in a one-to-one correspondence with the N−1 time-frequency resource groups.

In this embodiment of this application, the specific process of manner 7 may be similar to the specific process of manner 1, that is, the feedback information of the first data of the N−1 first coordinated transmission points in manner 7 belongs to the feedback information of the first data of the N first transmission points in manner 1. To avoid repetition, detailed descriptions are omitted herein.

Manner 8:

Optionally, when N>3, that the terminal device sends the feedback information of the first data of the N−1 first coordinated transmission points using at least one first time-frequency resource includes that the terminal device determines at least one time-frequency resource group S from a plurality of time-frequency resources and a bit sequence F from a plurality of bit sequences based on the feedback information of the first data of the N−1 first coordinated transmission points and a preset second mapping relationship, where the second mapping relationship is used to indicate a mapping relationship between a plurality of second transmission resource combinations and a plurality of second feedback value combinations, each second transmission resource combination includes at least one of the plurality of time-frequency resources and at least one of the plurality of bit sequences, each second feedback value combination includes N−1 groups of feedback values, a second transmission resource combination to which the time-frequency resource group S and the bit sequence F belong corresponds to a second feedback value combination to which a feedback value of the feedback information of the first data of the N−1 first coordinated transmission points belongs, each group of feedback values includes at least one feedback value, and each bit sequence includes at least two bits, and the terminal device sends the bit sequence F using the time-frequency resource group S.

In addition, when N>3, that the first transmission point Ti receives feedback information of the first data Di includes that the first transmission point Ti receives, using at least one time-frequency resource group S in a plurality of time-frequency resources, a bit sequence F in a plurality of bit sequences sent by the terminal device, where each bit sequence includes at least two bits, the first transmission point Ti determines the feedback information of the first data of the N−1 first coordinated transmission points based on the at least one time-frequency resource group S, the bit sequence F, and a preset second mapping relationship, where the second mapping relationship is used to indicate a mapping relationship between a plurality of second transmission resource combinations and a plurality of second feedback value combinations, each second transmission resource combination includes at least one of the plurality of time-frequency resources and at least one of the plurality of bit sequences, each second feedback value combination includes N−1 groups of feedback values, a second transmission resource combination to which the time-frequency resource group S and the bit sequence F belong corresponds to a second feedback value combination to which a feedback value of the feedback information of the first data of the N−1 first coordinated transmission points belongs, and each group of feedback values includes at least one feedback value, and the first transmission point Ti determines the feedback information of the first data Di from the feedback information of the first data of the N−1 first coordinated transmission points.

Further, in this embodiment of this application, the terminal device may indicate the feedback information of the first data of the N−1 first coordinated transmission points using a combination of at least one time-frequency resource (an example of the time-frequency resource group S) and one bit sequence (an example of the bit sequence F).

There may be one second time-frequency resource (that is, manner 8A), or there may be a plurality of second time-frequency resources (that is, manner 8B). The following separately describes in detail the feedback information transmission process in the foregoing two manners.

Manner 8A

In this embodiment of this application, first data may be a transport block (TB), and each first transmission point sends a maximum of two TBs. That is, when there are N−1 first coordinated transmission points, the terminal device needs to feed back a maximum of 2(N−1) pieces (2(N−1) code words) of feedback information. As described above, each piece of feedback information may be an ACK or a NACK. Therefore, the 2(N−1) pieces of feedback information have $2^{2(N-1)}$ possible permutations and combinations.

As described above, the N−1 first coordinated transmission points may use N−1 PDCCHs, and two time-frequency resources (for example, PUCCHs) that are used to transmit feedback information may be determined based on each PDCCH. That is, the terminal device and the N−1 first coordinated transmission points may determine 2(N−1) time-frequency resources (denoted as fifth candidate time-frequency resources below for ease of understanding and differentiation) that may be used to transmit feedback information, and each fifth candidate time-frequency resource may carry 2-bit information (namely, a bit sequence, where the bit sequence has 2×2 possible bit combinations). In this case, there are 2(N−1)×2×2=8(N−1) combinations of the foregoing determined 2(N−1) fifth candidate time-frequency resources and the bit sequence.

Optionally, the at least one first time-frequency resource includes a time-frequency resource determined based on a downlink control channel.

Further, for example, when N=3, there are two first coordinated transmission points, and $2^{2(N-1)}=8(N-1)=16$. Therefore, the terminal device and the first coordinated transmission point may determine a one-to-one mapping relationship (an example of the second mapping relationship) between the $2^{2(N-1)}$ feedback information combinations and the 8(N−1) combinations of the fifth candidate time-frequency resources and the bit sequence.

It should be noted that, in this embodiment of this application, to improve communication reliability and accuracy, the second mapping relationship determined by the terminal device and the first coordinated transmission point is consistent. Further, for a same feedback information combination, a combination that is of a time-frequency resource and a bit sequence, indicated by the second mapping relationship stored in the terminal device and the first coordinated transmission point, and corresponding to the feedback information combination is the same. In addition, as an example instead of a limitation, in this embodiment of this application, the second mapping relationship may be determined by the first transmission point (for example, a serving transmission point of the terminal device, namely, the serving transmission point #A), and is delivered by the first transmission point to the terminal device. Alternatively, the second mapping relationship may be determined by the terminal device and the first coordinated transmission point through negotiation. Alternatively, the second mapping relationship may be determined by an operator and delivered by the operator to the terminal device and the first coordinated transmission point. Alternatively, the second mapping relationship may be stipulated in a communications protocol. To avoid repetition, descriptions of same or similar cases are omitted below.

As an example instead of a limitation, the following Table 3 shows an example of the second mapping relationship.

As described above, in this case, each first coordinated transmission point sends a maximum of two TBs, that is, the terminal device needs to feed back a maximum of four pieces (four code words) of feedback information (an ACK or a NACK).

In the following, the two first coordinated transmission points are denoted as a coordinated transmission point #B and a coordinated transmission point #C, two TBs from the coordinated transmission point #B are denoted as a TB #8 and a TB #9, and two TBs from the coordinated transmission point #C are denoted as a TB #10 and a TB #11. Time-frequency resources (for example, PUCCHs) determined based on a PDCCH used by the coordinated transmission point #B are denoted as a PUCCH #7 and a PUCCH #8, and time-frequency resources (for example, PUCCHs) determined based on a PDCCH used by the coordinated transmission point #C are denoted as a PUCCH #9 and a PUCCH #10.

A mapping relationship (an example of the second mapping relationship) between a possible combination of the foregoing four pieces of feedback information (feedback information of the TB #8 to the TB #11) and a combination of fifth candidate time-frequency resources (the PUCCH #7 to the PUCCH #10) and a bit sequence may be shown in the following Table 3.

It should be noted that, Table 3 is merely an example for description, and may be randomly changed based on an actual requirement. For example, a ranking order of the possible combination of the feedback information of the TB

8 to the TB #11 in Table 3 may be changed, or a ranking order of the combination of the fifth candidate time-frequency resources and the bit sequence may be changed.

TABLE 3

| Index | Feedback information of the TB #8 | Feedback information of the TB #9 | Feedback information of the TB #10 | Feedback information of the TB #11 | Time-frequency resource PUCCH | Bit sequence |
|---|---|---|---|---|---|---|
| 0 | ACK | ACK | ACK | ACK | PUCCH #7 | 1, 1 |
| 1 | ACK | ACK | ACK | NACK | PUCCH #7 | 1, 0 |
| 2 | ACK | ACK | NACK | ACK | PUCCH #7 | 0, 1 |
| 3 | ACK | ACK | NACK | NACK | PUCCH #7 | 0, 0 |
| 4 | ACK | NACK | ACK | ACK | PUCCH #8 | 1, 1 |
| 5 | ACK | NACK | ACK | NACK | PUCCH #8 | 1, 0 |
| 6 | ACK | NACK | NACK | ACK | PUCCH #8 | 0, 1 |
| 7 | ACK | NACK | NACK | NACK | PUCCH #8 | 0, 0 |
| 8 | NACK | ACK | ACK | ACK | PUCCH #9 | 1, 1 |
| 9 | NACK | ACK | ACK | NACK | PUCCH #9 | 1, 0 |
| 10 | NACK | ACK | NACK | ACK | PUCCH #9 | 0, 1 |
| 11 | NACK | ACK | NACK | NACK | PUCCH #9 | 0, 0 |
| 12 | NACK | NACK | ACK | ACK | PUCCH #10 | 1, 1 |
| 13 | NACK | NACK | ACK | NACK | PUCCH #10 | 1, 0 |
| 14 | NACK | NACK | NACK | ACK | PUCCH #10 | 0, 1 |
| 15 | NACK | NACK | NACK | NACK | PUCCH #10 | 1, 1 |

In this case, the terminal device may search, based on a combination (denoted as a combination #7 below for ease of understanding and description) of feedback information that currently needs to be transmitted, the second mapping relationship (for example, the foregoing Table 3) for a combination (denoted as a combination #8 below for ease of understanding and description) that is of a fifth candidate time-frequency resource (an example of the time-frequency resource group S) and a bit sequence (an example of the bit sequence F) and that is corresponding to the combination #7.

Therefore, in S210, the terminal device may transmit the bit sequence in the combination #8 using the time-frequency resource in the combination #8.

In addition, in this embodiment of this application, the first coordinated transmission point may perform blind detection on time-frequency resources (for example, the PUCCH #7 to the PUCCH #10) determined based on a PDCCH used by each first coordinated transmission point. Therefore, the first coordinated transmission point can determine a time-frequency resource (an example of a second time-frequency resource) that carries a bit sequence (an example of a second bit sequence), and further determine the combination #8.

Then, the first coordinated transmission point may search the second mapping relationship (for example, the foregoing Table 3) for a feedback information combination (the combination #7) corresponding to the combination #8, and further determine the feedback information of the first data of the N−1 first coordinated transmission points.

Optionally, the at least one second time-frequency resource includes a time-frequency resource determined based on a downlink control channel.

Alternatively, optionally, the at least one second time-frequency resource includes a time-frequency resource indicated by second signaling received by the terminal device.

For another example, when N>3 and $2^{2(N-1)}>8(N-1)$, a quantity of combinations of a bit sequence and fifth candidate time-frequency resources determined based on a PDCCH is less than a quantity of feedback information combinations, and the combinations of the fifth candidate time-frequency resources and the bit sequence cannot correspond to all feedback information combinations.

In this case, the first transmission point (for example, the serving transmission point #A) may allocate a plurality of time-frequency resources (denoted as sixth candidate time-frequency resources below for ease of understanding and description) to the terminal device, and notify the terminal device of the sixth candidate time-frequency resources using signaling (an example of the second signaling) such that a quantity of combinations of the foregoing fifth candidate time-frequency resources (time-frequency resources determined based on PDCCHs used by the N−1 first coordinated transmission points), the sixth candidate time-frequency resources (time-frequency resources indicated based on the signaling), and the bit sequence is greater than or equal to a quantity ($2^{2(N-1)}$) of possible feedback information combinations.

Therefore, the terminal device and the N−1 first coordinated transmission points may determine a one-to-one mapping relationship (another example of the second mapping relationship) between the $2^{2(N-1)}$ feedback information combinations and $2^{2(N-1)}$ combinations of time-frequency resources and a bit sequence.

In this case, in addition to the fifth candidate time-frequency resources (the PUCCH #7 to the PUCCH #10), time-frequency resources shown in the foregoing Table 3 may include a sixth candidate time-frequency resource.

That is, in this embodiment of this application, if a coordinating cluster includes more than three coordinated points (N>3), PDCCHs of the N−1 first coordinated transmission points correspond to 2(N−1) PUCCH resources, each resource may carry 2-bit information, and 8(N−1) pieces of ACK/NACK information combinations may be indicated. There are a total of $2^{2(N-1)}$ ACK/NACK information combinations. As N gradually increases, performing feedback on only one of the 2(N−1) PUCCH resources cannot cover all cases. Therefore, some PUCCH resources may be additionally configured using a higher layer, and the terminal device may indicate all cases of the $2^{2(N-1)}$ ACK/NACK information combinations by selecting different resources and adding carried 2-bit information.

It should be understood that the foregoing enumerated manner of determining a time-frequency resource in the second mapping relationship is merely an example for description, and this application is not limited thereto. For example, all time-frequency resources in the second mapping relationship may be time-frequency resources that are allocated by the first transmission point (for example, the serving transmission point #A) and that are indicated using signaling.

Manner 8B:

Different from manner 8A, in manner 8B, there are at least two second time-frequency resources. That is, the terminal device may transmit a bit sequence using at least two time-frequency resources.

The terminal device may transmit a bit sequence using W time-frequency resources, and each time-frequency resource may carry 2-bit information (namely, a bit sequence, where the bit sequence has $2^{2W}$ possible bit combinations). If there are Z (Z≥W) candidate time-frequency resources (including a fifth candidate time-frequency resource, or including a sixth candidate time-frequency resource, or including a fifth candidate time-frequency resource and a sixth candidate time-frequency resource), there are C(Z, W)×$2^{2W}$ combinations of the W candidate time-frequency resources and the bit sequence.

Generally, a processing process in the case of N=4 and W=2 is used as an example for description.

In this case, there are $2^{2(N-1)}$=64 feedback information combinations.

The N−1 first coordinated transmission points may use N−1 PDCCHs, and two time-frequency resources (for example, PUCCHs) that are used to transmit feedback information may be determined based on each PDCCH. That is, the terminal device and the N−1 first coordinated transmission points may determine 2(N−1) time-frequency resources (fifth candidate time-frequency resources) that may be used to transmit feedback information, and each fifth candidate time-frequency resource may carry 2-bit information (namely, a bit sequence).

In this case, there are C(6, 2)×$2^4$=240 combinations of the candidate time-frequency resources and the bit sequence.

In this case, the quantity of combinations of the candidate time-frequency resources and the bit sequence is greater than the quantity of feedback information combinations.

Therefore, the terminal device and the first transmission point may determine 64 combinations from C(6, 2)×$2^4$=240 combinations of the candidate time-frequency resources and the bit sequence, and determine a one-to-one mapping relationship (another example of the second mapping relationship) between the 64 feedback information combinations and $2^{2(N-1)}$ combinations of candidate time-frequency resources and a bit sequence.

The terminal device may search, based on a combination (denoted as a combination #9 below for ease of understanding and description) of feedback information that currently needs to be transmitted, the second mapping relationship for a combination (denoted as a combination #10 below for ease of understanding and description) that is of W (for example, 2) time-frequency resources (another example of the time-frequency resource group S) and a bit sequence (an example of the bit sequence F) including 2 W (for example, 4) bits and that is corresponding to the combination #9.

Therefore, in S210, the terminal device may transmit the bit sequence in the combination #10 using the W time-frequency resources in the combination #10.

In addition, in this embodiment of this application, the N−1 first coordinated transmission points may perform blind detection on Z time-frequency resources (for example, time-frequency resources determined based on PDCCHs used by the N−1 first coordinated transmission points and/or time-frequency resources determined based on signaling) such that the N−1 first coordinated transmission points can determine the W time-frequency resources (another example of second time-frequency resources) that carry a bit sequence (an example of a second bit sequence), and further determine the combination #10.

Then, the N−1 first coordinated transmission points may search the second mapping relationship for a feedback information combination (e.g. the combination #9) corresponding to the combination #10, and further determine the feedback information of the first data of the N−1 first coordinated transmission points.

Similar to manner 8A, in manner 8B, the Z time-frequency resources may include a time-frequency resource determined based on a downlink control channel and/or a time-frequency resource indicated by signaling (an example of fourth signaling).

As described above, in manner 8B, for example, when N−1=3, there are a maximum of six code words of ACK/NACK feedback information, and there are a total of $2^6$=64 combinations. There are six time-frequency resources (for example, PUCCHs) determined based on PDCCHs, there are C(6, 2)=15 possible cases if any two time-frequency resources are combined, and there are $2^4$=16 possible combinations of a bit sequence including four bits. In this case, there are 15×16 possible combinations of the time-frequency resources and the bit sequence, and 64 ACK/ACK combinations can be certainly indicated.

It should be noted that, manner 8A and manner 8B may be separately used or may be jointly used. This is not further limited in this application. For example, a manner in which two bits are fed back using one PUCCH may be combined with a manner in which four bits are fed back using two PUCCHs. That is, if the feedback manner in which two bits are fed back based on one PUCCH is insufficient to meet feedback information combinations, the manner in which four bits are fed back using two PUCCHs may be used to feed back remaining feedback information combinations.

Manner 9:

Optionally, that the terminal device sends feedback information of first data of the N−1 first coordinated transmission points, feedback information of first data of the first serving transmission point, and feedback information of the second data using the at least one time-frequency resource includes that the terminal device sends the feedback information of the first data of the N−1 first coordinated transmission points, the feedback information of the first data of the first serving transmission point, and the feedback information of the second data according to a second order based on one time-frequency resource indicated by received sixth signaling, where the second order is a ranking order of the feedback information of the first data of the N−1 first coordinated transmission points, the feedback information of the first data of the first serving transmission point, and the feedback information of the second data on the one time-frequency resource.

In addition, that the first transmission point Ti receives feedback information of the first data Di includes that the first transmission point Ti receives the feedback information of the first data of the N−1 first coordinated transmission points, the feedback information of the first data of the first serving transmission point, and the feedback information of the second data based on one time-frequency resource indicated by sixth signaling, where the feedback information of the first data of the N−1 first coordinated transmission points, the feedback information of the first data of the first serving transmission point, and the feedback information of the second data are sent by the terminal device according to a second order, and the first transmission point Ti determines the feedback information of the first data Di from the feedback information of the first data of the N−1 first coordinated transmission points, the feedback information of the first data of the first serving transmission point, and the feedback information of the second data according to the second order.

Further, in this embodiment of this application, the terminal device may simultaneously feed back and send the feedback information of the first data of the N−1 first coordinated transmission points, the feedback information of the first data of the first serving transmission point, and the feedback information of the second data using a PUCCH format 3/4.

A time-frequency resource used by the PUCCH format 3/format 4 is configured by the first transmission point (for example, the serving transmission point #A) using signaling (an example of the sixth signaling), and does not correspond to a start CCE of a PDCCH.

For example, for the PUCCH format 3, the first transmission point (for example, the serving transmission point #A) configures a resource of the PUCCH format 3 for the terminal device using 3PUCCH-AN-List-r10 and n3PUCCH-AN-ListP1-r10 format 3. When a quantity of transmission points (first transmission points) that participate in coordinated transmission is relatively large, the PUCCH format 3 may be selected to simultaneously feed back ACK/NACK information corresponding to a plurality of first transmission points. In this case, ACK/NACK information of a maximum of five first transmission points can be fed back. Certainly, feedback may also be performed for two transmission points using the PUCCH format 3. If a quantity (for example, more than five) of first transmission points is larger, the PUCCH format 4 may be further used to support feedback of a maximum of 22 bits of ACK/NACK information.

In addition, when the feedback information (denoted as feedback information #1 below for ease of understanding and description) of the first data of the N−1 first coordinated transmission points (for example, the N−1 coordinated transmission points), the feedback information (denoted as feedback information #2 below for ease of understanding and description) of the first data of the first serving transmission point (for example, the serving transmission point #A), and the feedback information (denoted as feedback information #3 below for ease of understanding and description) of the second data of the second transmission point (for example, the serving transmission point #B) are carried on one PUCCH format 3 resource, the feedback information #1 to the feedback information #3 need to be ranked in a specified order (an example of the second order). For example, the feedback information #2 and the feedback information #3 (feedback information of serving cells) are carried in the first four bits of a bit sequence of the PUCCH format 3 resource. For example, if N−1=2, that is, two coordinated transmission points are included, the feedback information #1 is carried in the last four bits of the bit sequence of the PUCCH format 3 resource. In this case, the terminal device feeds back feedback information (for example, ACK/NACK information) including a total of eight bits.

It should be noted that, in this embodiment of this application, the ranking order of the feedback information #1 to the feedback information #3 is merely an example for description and is not limited in this application, and may be randomly changed based on an actual requirement. Because a maximum of 10 bits of ACK/NACK information can be fed back using the format 3, when a quantity of serving cells (CA) accessed by UE and a quantity of coordinated cells that participate in coordinated transmission (coordinated multi-point multi-stream transmission) are relatively large, the PUCCH format 4 may be further used to support feedback of a maximum of 22 bits of ACK/NACK information.

As an example instead of a limitation, in this embodiment of this application, the second order may be performing ranking in ascending order or descending order of transmission point indexes.

Optionally, indication information of the second order is preconfigured in the terminal device, or the method further includes that the terminal device receives seventh signaling, where the signaling is used to indicate the second order.

Further, in this embodiment of this application, the second order may be specified in a communications system or a communications protocol, or the second order may be preset by a manufacturer or a network operator in the terminal device and a transmission point, or the second order may be determined by the terminal device and a transmission point through negotiation. For example, the second order may be determined by a transmission point (for example, a serving transmission point), and is indicated by the transmission point to the terminal device using signaling (an example of the seventh signaling).

Optionally, the second order may be determined in an implicit manner.

For example, in this embodiment of this application, the second order may be determined based on related information of a DMRS antenna port group of at least one of the N pieces of first data and/or related information of a DMRS antenna port group of the second data.

Content and a determining manner of the related information of the DMRS antenna port group of the first data or the second data may be similar to the content and the determining manner of the related information of the DMRS antenna port group described in manner a. To avoid repetition, detailed descriptions are omitted herein. For example, related information of a DMRS antenna port group may be determined according to quasi co-location indication information of a DMRS antenna port, or related information of a DMRS antenna port group may be carried in control information.

As an example instead of limitation, for example, a quantity of antenna port groups is predefined as 2. A first transmission point sends control information 1, and the control information 1 indicates a DMRS antenna port group 1. A second transmission point sends control information 2, and the control information 2 indicates a DMRS antenna port group 2. In this case, the terminal determines the second order based on information about a DMRS antenna port group. For example, the second order is determined based on a number of a DMRS antenna port group. For example, a smaller group number may be ranked in front of a larger group number. For example, ACK/NACK information of data corresponding to the DMRS antenna port group 1 is ranked in front of ACK/NACK information of data corresponding to the DMRS antenna port group 2. Other ranking orders may also be applied to this embodiment of this application. This is not further limited herein.

For another example, if quasi co-location indication information of an antenna port for sending a DMRS by a first transmission point is quasi co-location indication information 1, the quasi co-location indication information 1 indicates a DMRS antenna port group 1. In addition, if quasi co-location indication information of an antenna port for sending a DMRS by a second transmission point is quasi co-location indication information 2, the quasi co-location indication information 2 indicates a DMRS antenna port group 2. In this case, for example, the second order may be determined based on a number of a DMRS antenna port group. For example, a smaller group number may be ranked in front of a larger group number. For example, ACK/NACK information of data corresponding to the DMRS antenna port group 1 is ranked in front of ACK/NACK information of data corresponding to the DMRS antenna port group 2. Other ranking orders may also be applied to this embodiment of this application. This is not further limited herein.

For another example, in this embodiment of this application, the second order may be determined based on related information of a code word of at least one of the N pieces of first data and/or related information of a code word of the second data.

As an example instead of a limitation, related information of a code word may be carried in control information.

Further, for example, a first transmission point sends control information 1, and the control information 1 indicates code word indication information 1, a second transmission point sends control information 2, and the control information 2 indicates code word indication information 2. In this case, the terminal determines the second order according to code word indication information. For example, the second order is determined based on a number of code word indication information. For example, code word indication information with a smaller number may be ranked in front of code word indication information with a larger number. For example, ACK/NACK information of data corresponding to the code word indication information 1 is ranked in front of ACK/NACK information of data corresponding to the code word indication information 2. Other ranking orders may also be applied to this embodiment of this application. This is not limited herein.

For another example, in this embodiment of this application, the second order may be determined based on related information of a transmission point of at least one of the N pieces of first data and/or related information of a transmission point of the second data.

As an example instead of a limitation, related information of a transmission point may be carried in control information.

Further, for example, a first transmission point sends control information 1, and the control information 1 indicates transmission point identification information 1, a second transmission point sends control information 2, and the control information 2 indicates transmission point identification information 2. In this case, the terminal determines the second order based on transmission point identification information. For example, the second order is determined based on a number of transmission point identification information. For example, transmission point identification information with a smaller number may be ranked in front of transmission point identification information with a larger number. For example, ACK/NACK information of data corresponding to the transmission point identification information 1 is ranked in front of ACK/NACK information of data corresponding to the transmission point identification information 2. Other ranking orders may also be applied to this embodiment of this application. This is not further limited herein.

For another example, in this embodiment of this application, the second order may be determined based on a number of a control channel resource set in which control information of first data is located and/or a number of a control channel resource set in which control information of second data is located.

Further, for example, control information of first data or second data transmitted by a first transmission point is transmitted on a resource corresponding to a control channel resource set numbered 1, and control information of first data or second data transmitted by a second transmission point is transmitted on a resource corresponding to a control channel resource set numbered 2. In this case, the terminal determines the second order based on a number of a control channel resource set in which detected control information is located.

For example, if the terminal detects control information 1 from the control channel resource set numbered 1 and detects control information 2 from the control channel resource set numbered 2, the terminal determines that ACK/NACK information of data corresponding to the control information 1 is ranked in front of ACK/NACK of data corresponding to the control information 2. Other ranking orders may also be applied to this embodiment of this application. This is not limited herein.

For another example, in this embodiment of this application, the second order may be determined based on a location (for example, a time domain location or a frequency domain location) of a control channel resource set in which control information of first data is located and/or a location (for example, a time domain location or a frequency domain location) of a control channel resource set in which control information of second data is located.

Further, for example, control information of first data or second data transmitted by a first transmission point is transmitted on resources corresponding to frequency domain numbers A and B in a location of a control channel resource set, and control information of first data or second data transmitted by a second transmission point is transmitted on resources corresponding to frequency domain numbers C and D in a location of a control channel resource set. In this case, the terminal determines the second order based on a location of a control channel resource set in which detected control information is located.

For example, the terminal detects control information 1 on the resources corresponding to the frequency domain numbers A and B of the control channel resource set and detects control information 2 on the resources corresponding to the frequency domain numbers C and D of the control channel resource set. For example, if $A<B<C<D$, the terminal determines that ACK/NACK information of data corresponding to the control information 1 is ranked in front of ACK/NACK information of data corresponding to the control information 2. Other ranking orders may also be applied to this embodiment of this application. This is not limited herein.

For another example, in this embodiment of this application, the second order may be determined based on a candidate control channel location (for example, a time domain location or a frequency domain location) in which control information of first data is located and/or a candidate control channel location (for example, a time domain location or a frequency domain location) in which control information of second data is located.

Further, for example, control information of first data or second data transmitted by a first transmission point is transmitted on a resource corresponding to a candidate control channel location 1, and control information of first data or second data transmitted by a second transmission point is transmitted on a resource corresponding to a candidate control channel location 2. In this case, the terminal determines the second order based on a candidate control channel location in which detected control information is located.

For example, if the terminal detects control information 1 on the resource corresponding to the candidate control channel location 1 and detects control information 2 on the resource corresponding to the candidate control channel location 2, the terminal determines that ACK/NACK information of data corresponding to the control information 1 is ranked in front of ACK/NACK information of data corresponding to the control information 2. Other ranking orders may also be applied to this embodiment of this application. This is not limited herein.

For another example, in this embodiment of this application, the second order may be determined based on a number of a control channel element in which control information of first data is located and/or a number of a control channel element in which control information of second data is located.

Further, for example, control information of first data or second data transmitted by a first transmission point is transmitted on resources corresponding to control channel element numbers E and F, and control information of first data or second data transmitted by a second transmission point is transmitted on resources corresponding to control channel element numbers G and H. In this case, the terminal determines the second order based on a number of a control channel element in which detected control information is located.

For example, the terminal detects control information 1 on the resources corresponding to the control channel element numbers E and F, and detects control information 2 on the resources corresponding to the control channel element numbers G and H. For example, if E<G, the terminal determines that ACK/NACK information of data corresponding to the control information 1 is ranked in front of ACK/NACK information of data corresponding to the control information 2. Other ranking orders may also be applied to this embodiment of this application. This is not further limited herein.

For another example, in this embodiment of this application, the second order may be determined based on configuration information of a control channel resource set in which control information of first data and/or second data is located.

Further, for example, the configuration information of the control channel resource set indicates an ACK/NACK feedback order. The terminal may determine, based on the configuration information of the control channel resource set, an ACK/NACK feedback order of data corresponding to control information detected in the control channel resource set.

Further, for example, when the configuration information of the control channel resource set indicates that ACK/NACK feedback ranks higher, the terminal may determine that ACK/NACK feedback of the data corresponding to the control information detected in the control channel resource set ranks higher. For example, when the configuration information of the control channel resource set indicates that ACK/NACK feedback ranks lower, the terminal may determine that ACK/NACK feedback of the data corresponding to the control information detected in the control channel resource set ranks lower. Other ranking orders may also be applied to this embodiment of this application. This is not further limited herein.

Optionally, the second order may be determined based on another characteristic of control information of first data and/or second data, and this is not limited herein.

The control information in this application may be downlink data transmission information or other information. This is not limited herein.

It should be understood that the foregoing enumerated methods and processes of determining the second order are merely examples for description, and this application is not limited thereto. Another method for determining the second order may also be applied to this embodiment of this application.

Case 2B:

Optionally, the first data of the N−1 first coordinated transmission points corresponds to one piece of downlink control information, and the downlink control information is carried on one downlink control channel.

Further, in this embodiment of this application, each of the N−1 first coordinated transmission points may use a same downlink control channel such as a PDCCH. That is, in this embodiment of this application, one piece of downlink control information may include downlink data transmission information of the N−1 first coordinated transmission points. In this case, the terminal device may receive, based on one PDCCH (or that is, one piece of DCI), the N−1 pieces of first data sent by the N−1 first coordinated transmission points.

In this embodiment of this application, feedback information of the N pieces of first data may be transmitted in at least one of the following manners.

Manner 10:

Optionally, when N=2, that the terminal device sends the feedback information of the N pieces of first data using at least one time-frequency resource includes the terminal device determines one time-frequency resource group based on the downlink control channel, where the one time-frequency resource group includes at least two time-frequency resources, and the terminal device sends the feedback information of the first data of the N−1 first coordinated transmission points using one time-frequency resource in the one time-frequency resource group, and the terminal device sends the feedback information of the first data of the first serving transmission point and the feedback information of the second data using another time-frequency resource in the one time-frequency resource group.

Further, in manner 10, in a scenario in which the terminal device accesses only two serving transmission points (that is, serving cells), when N=2, the feedback information of the N pieces of first data and the feedback information of the second data may be transmitted using one time-frequency resource group.

It should be noted that, in manner 10, one piece of first data may be one transport block, that is, in manner 10, one first transmission point sends one transport block to the terminal device.

It should be noted that, in this embodiment of this application, the one time-frequency resource group may include one or more (for example, two) PUCCH resources.

As an example instead of a limitation, a manner of determining the one time-frequency resource group may be similar to manner 4. To avoid repetition, detailed descriptions are omitted herein.

As described above, in manner 10, two first transmission points separately perform precoding on two pieces of data (two TBs), and send the two TBs obtained after precoding to the terminal device. Each first transmission point transmits one transport block. Based on a coordinated multipoint multi-stream transmission scheme in which a single downlink PDCCH corresponds to data transmission of two PDSCHs, scheduling information of the two first transmission points is combined, and when the combined scheduling information is sent by the first serving transmission point to the terminal using one piece of DCI information, a method for feeding back an ACK/a NACK for downlink transmission is as follows Because multipoint multi-stream transmission corresponds to only one PDCCH, the multipoint multi-stream transmission may correspond to one time-frequency resource group (including two PUCCH resources) based on the PDCCH, and feedback information of two TBs can be transmitted. When N=2, that is, a serving cell and a coordinated cell each transmit one TB, feedback information of one TB may be transmitted using one PUCCH resource in the one time-frequency resource group, and feedback information of the other TB is transmitted using the other PUCCH resource in the one time-frequency resource group. That is, the one time-frequency resource group can carry two bits, one bit corresponds to feedback information of one TB, and the other bit corresponds to feedback information of the other TB.

In addition, in manner 10, the feedback information of the second data and the feedback information of the first data of the first serving transmission point may be carried on a same PUCCH resource.

It should be noted that, in manner 10, a PUCCH resource that is in one time-frequency resource group and on which feedback information of each TB is carried may be predefined in a communications system or a communications protocol, or may be indicated by a transmission point to the terminal device using signaling. That is, a ranking order of two bits may be determined in a predefined manner or a signaling indication manner. For example, a first bit is used to feed back ACK/NACK information of the first serving transmission point, and a second bit is used to feed back ACK/NACK information of a first coordinated transmission point.

Manner 11:

Optionally, when N>3, that the terminal device sends the feedback information of the first data of the N−1 first coordinated transmission points using at least one first time-frequency resource includes that the terminal device determines at least one time-frequency resource group S from a plurality of time-frequency resources and a bit sequence F from a plurality of bit sequences based on the feedback information of the first data of the N−1 first coordinated transmission points and a preset second mapping relationship, where the second mapping relationship is used to indicate a mapping relationship between a plurality of second transmission resource combinations and a plurality of second feedback value combinations, each second transmission resource combination includes at least one of the plurality of time-frequency resources and at least one of the plurality of bit sequences, each second feedback value combination includes N−1 groups of feedback values, a second transmission resource combination to which the time-frequency resource group S and the bit sequence F belong corresponds to a second feedback value combination to which a feedback value of the feedback information of the first data of the N−1 first coordinated transmission points belongs, each group of feedback values includes at least one feedback value, and each bit sequence includes at least two bits, and the terminal device sends the bit sequence F using the time-frequency resource group S.

Further, in this embodiment of this application, the terminal device may indicate the feedback information of the first data (for example, a TB) of the N−1 (N>3) first coordinated transmission points using a combination of one time-frequency resource (an example of the time-frequency resource group S) and one bit sequence (an example of the bit sequence F).

In manner 11, one piece of first data may be one TB, and each first transmission point sends at least one TB. That is, when there are N−1 first coordinated transmission points, the terminal device may need to feed back N−1 pieces (N−1 code words) of feedback information. As described above, each piece of feedback information may be an ACK or a NACK. Therefore, the N pieces of feedback information have $2^{N-1}$ possible permutations and combinations.

As described above, the N transmission points may use one PDCCH, and one time-frequency resource group (including two time-frequency resources such as PUCCHs) that is used to transmit feedback information may be determined based on the one PDCCH. That is, the terminal device and the first transmission point may determine two time-frequency resources that may be used to transmit feedback information. One of the time-frequency resources is used to transmit the feedback information of the first data of the first serving transmission point and the feedback information of the second data, and the other time-frequency resource (denoted as a seventh candidate time-frequency resource below for ease of understanding and differentiation) is used to transmit the feedback information of the first data of the N−1 first coordinated transmission points. The seventh candidate time-frequency resource may carry 2-bit information (namely, a bit sequence, where the bit sequence has 2×2 possible bit combinations). In this case, there are 2×2=4 combinations of the foregoing determined one seventh candidate time-frequency resource and the bit sequence.

Optionally, the at least one time-frequency resource includes a time-frequency resource determined based on a downlink control channel.

Further, for example, when N=3 and $2^{N-1}$=4, the terminal device and the N−1 first coordinated transmission points may determine a one-to-one mapping relationship (another example of the second mapping relationship) between the $2^{N-1}$ feedback information combinations and four combinations of the seventh candidate time-frequency resource and the bit sequence.

As an example instead of a limitation, the following Table 4 shows another example of the second mapping relationship.

As described above, in this case, each first coordinated transmission point may send at least one TB (for example, a total of two TBs), that is, the terminal device needs to feed back two pieces (further, two code words) of feedback information (an ACK or a NACK).

The two TBs are denoted as a TB #12 and a TB #13 below. The one seventh candidate time-frequency resource is denoted as a PUCCH #11.

A mapping relationship (an example of the second mapping relationship) between a possible combination of the foregoing two pieces of feedback information (feedback information of the TB #12 and the TB #13) and a bit sequence combination may be shown in the following Table 4.

It should be noted that, Table 4 is merely an example for description, and may be randomly changed based on an actual requirement. For example, a ranking order of the possible combination of the feedback information of the TB

12 and the TB #13 in Table 4 may be changed, or a ranking order of the bit sequence combination may be changed.

TABLE 4

| Index | TB #12 | TB #13 | Time-frequency resource PUCCH PUCCH | Bit sequence |
|---|---|---|---|---|
| 0 | ACK | ACK | PUCCH #11 | 1, 1 |
| 1 | ACK | NACK | PUCCH #11 | 1, 0 |
| 2 | NACK | ACK | PUCCH #11 | 0, 1 |
| 3 | NACK | NACK | PUCCH #11 | 0, 0 |

In this case, the terminal device may search, based on a combination (denoted as a combination #11 below for ease of understanding and description) of feedback information that currently needs to be transmitted, the second mapping relationship (for example, the foregoing Table 4) for a combination (denoted as a combination #12 below for ease of understanding and description) that is of a seventh candidate time-frequency resource (an example of the time-frequency resource group S) and a bit sequence (an example of the bit sequence F) and that is corresponding to the combination #11.

Therefore, in S210, the terminal device may transmit the bit sequence in the combination #12 using the time-frequency resource in the combination #12.

In addition, in this embodiment of this application, the N−1 first coordinated transmission points may detect a seventh candidate time-frequency resource (for example, the PUCCH #11) determined based on a PDCCH such that the N−1 first coordinated transmission points can determine a bit sequence (an example of the bit sequence F) sent by the terminal device, and further determine the combination #12.

Then, the first transmission point may search the second mapping relationship (for example, the foregoing Table 4) for a feedback information combination (the combination #11) corresponding to the combination #12, and further determine the feedback information of the first data of the N−1 first coordinated transmission points.

Optionally, the at least one time-frequency resource includes a time-frequency resource determined based on a downlink control channel.

Alternatively, optionally, the at least one time-frequency resource includes a time-frequency resource indicated by second signaling received by the terminal device.

Further, for another example, when N>3 and $2^{N-1}$>4, a quantity of combinations of a bit sequence and a seventh candidate time-frequency resource determined based on a PDCCH is less than a quantity of feedback information combinations, and the combinations of the seventh candidate time-frequency resource and the bit sequence cannot correspond to all feedback information combinations.

In this case, the first transmission point (for example, the serving transmission point #A) may allocate a plurality of time-frequency resources (denoted as eighth candidate time-frequency resources below for ease of understanding and description) to the terminal device, and notify the terminal device of the eighth candidate time-frequency resources using signaling (an example of the second signaling) such that a quantity of combinations of the foregoing seventh candidate time-frequency resource (a time-frequency resource determined based on a PDCCH used by the first transmission point), the eighth candidate time-frequency resources (time-frequency resources indicated based on the signaling) and the bit sequence is greater than or equal to a quantity ($2^{N-1}$) of possible feedback information combinations.

Therefore, the terminal device and the N−1 first coordinated transmission points may determine a one-to-one mapping relationship (another example of the second mapping relationship) between the $2^{N-1}$ feedback information combinations and $2^{N-1}$ combinations of time-frequency resources and a bit sequence.

In this case, in addition to the seventh candidate time-frequency resource (the PUCCH #11), time-frequency resources shown in the foregoing Table 4 may include an eighth candidate time-frequency resource.

In this embodiment of this application, if a coordinating cluster includes more than three coordinated points (that is, a quantity of TBs is greater than 3), a PDCCH of the N coordinated points corresponds to two PUCCH resources. One of the PUCCH resources may be used to transmit the feedback information of the first data of the first serving transmission point and the feedback information of the second data, the other PUCCH resource may carry 2-bit information, and four ACK/NACK combinations may be indicated. There are a total of $2^{N-1}$ possible combinations of the first data of the N−1 first coordinated transmission points. As N gradually increases, performing feedback on only one PUCCH resource cannot cover all cases. Therefore, some PUCCH resources may be additionally configured using a higher layer, and the terminal device may indicate all cases of the $2^{N-1}$ ACK/NACK information combinations by selecting different resources and adding carried 2-bit information.

It should be understood that the foregoing enumerated manner of determining a time-frequency resource in the second mapping relationship is merely an example for description, and this application is not limited thereto. For example, all time-frequency resources in the second mapping relationship may be time-frequency resources that are allocated by the first transmission point (for example, the serving transmission point #A) and that are indicated using signaling.

Manner 12:

Further, in this embodiment of this application, the terminal device may simultaneously feed back and send the feedback information of the first data of the N−1 first coordinated transmission points, the feedback information of the first data of the first serving transmission point, and the feedback information of the second data using a PUCCH format 3/4.

A time-frequency resource used by the PUCCH format 3/format 4 is configured by the first transmission point (for example, the serving transmission point #A) using signaling (an example of sixth signaling), and does not correspond to a start CCE of a PDCCH.

For example, for the PUCCH format 3, the first transmission point (for example, the serving transmission point #A) configures a resource of the PUCCH format 3 for the terminal device using 3PUCCH-AN-List-r10 and n3PUCCH-AN-ListP1-r10 format 3. When a quantity of transmission points (first transmission points) that participate in coordinated transmission is relatively large, the PUCCH format 3 may be selected to simultaneously feed back ACK/NACK information corresponding to a plurality of first transmission points. In this case, ACK/NACK information of a maximum of five first transmission points can be fed back. Certainly, feedback may also be performed for two transmission points using the PUCCH format 3. If a quantity (for example, more than five) of first transmission points is larger, the PUCCH format 4 may be further used to support feedback of a maximum of 22 bits of ACK/NACK information.

Further, when the feedback information (denoted as feedback information #1 below for ease of understanding and description) of the first data of the N−1 first coordinated transmission points (for example, the N−1 coordinated transmission points), the feedback information (denoted as feedback information #2 below for ease of understanding and description) of the first data of the first serving transmission point (for example, the serving transmission point #A), and the feedback information (denoted as feedback information #3 below for ease of understanding and description) of the second data of the second transmission point (for example, the serving transmission point #B) are carried on one PUCCH format 3 resource, the feedback information #1 to the feedback information #3 need to be ranked in a specified order (an example of the second order). For example, the feedback information #2 and the feedback information #3 (feedback information of serving cells) are carried in the first four bits of a bit sequence of the PUCCH format 3 resource. For example, if N−1=2, that is, two coordinated transmission points are included, the feedback information #1 is carried in the last four bits of the bit sequence of the PUCCH format 3 resource. In this case, the terminal device feeds back feedback information (for example, ACK/NACK information) including a total of eight bits.

In this embodiment of this application, the second order may be preset in the terminal device and a transmission point, or a transmission point may indicate the second order to the terminal device using signaling.

As an example instead of a limitation, in this embodiment of this application, the second order may be performing ranking in ascending order or descending order of transmission point indexes.

It should be noted that, in this embodiment of this application, the ranking order of the feedback information #1 to the feedback information #3 is merely an example for description and is not limited in this application, and may be randomly changed based on an actual requirement. Because a maximum of 10 bits of ACK/NACK information can be fed back using the format 3, when a quantity of serving cells accessed by UE and a quantity of coordinated cells that participate in coordinated transmission (coordinated multipoint multi-stream transmission) are relatively large, the PUCCH format 4 may be further used to support feedback of a maximum of 22 bits of ACK/NACK information.

In this embodiment of this application, one or more schemes in manner 1 to manner 12 may simultaneously exist. In this case, a serving transmission point explicitly indicates, using signaling (an example of fifth signaling), a manner currently to be used by the terminal device to perform ACK/NACK feedback.

According to the feedback information transmission method in this embodiment of this application, in a coordinated multipoint multi-stream transmission technology, after receiving, using a same carrier, a plurality of pieces of data transmitted by a plurality of transmission points, the terminal device sends feedback information of the plurality of pieces of data to the plurality of transmission points using one or more time-frequency resources such that the plurality of transmission points learn of a receiving status of transmitted data, to improve reliability of coordinated multipoint multi-stream transmission.

In addition, in the other approaches, after a transmission point (for example, a base station) sends downlink data to the terminal device, the terminal device may send feedback information to the transmission point based on a receiving status of the downlink data. For example, if the downlink data is correctly received, for example, a decoding result is correct, the terminal device may feedback ACK information (an example of the feedback information) to the transmission point. For another example, if the downlink data is incorrectly received, for example, a decoding result is incorrect, the terminal device may feedback NACK information (another example of the feedback information) to the transmission point.

In a communications system such as an LTE system in which an existing feedback technology is applied, only one PDSCH can be transmitted on a same carrier. That is, in the other approaches, feedback information of a maximum of two TBs of one PDSCH transmitted on the same carrier can be transmitted to one transmission point in one feedback information transmission process.

Therefore, in the existing feedback technology, a plurality of transmission points cannot send feedback information of a plurality of pieces of data to the terminal device on a same carrier during coordinated multipoint multi-stream transmission.

In contrast, in this embodiment of this application, in manner 1 to manner 12, sufficient time-frequency resources that are used to carry feedback information can be provided.

It should be noted that, the first order may be a ranking order of the feedback information of the N pieces of first data in time domain or a ranking order of the feedback information of the N pieces of first data in frequency domain. This is not limited in this application.

Similarly, the second order may be a ranking order of the feedback information of the first data of the N−1 first coordinated transmission points, the feedback information of the first data of the first serving transmission point, and the feedback information of the second data in time domain or a ranking order of the feedback information of the first data of the N−1 first coordinated transmission points, the feedback information of the first data of the first serving transmission point, and the feedback information of the second data in frequency domain. This is not limited in this application.

In the foregoing descriptions, a PUCCH format 3/4 resource is used as an example to describe a resource for transmitting feedback information. It should be understood that the PUCCH format 3/4 resource is merely an example of the resource for transmitting feedback information, and this application is not limited thereto. Other resources that are corresponding to a control channel format and that can be used to transmit feedback information shall fall within the protection scope of this embodiment of this application.

The feedback information transmission method in the embodiments of this application is described in detail above with reference to FIG. 2, and feedback information transmission apparatuses in the embodiments of this application are described in detail below with reference to FIG. 3 and FIG. 4.

Figure 3:
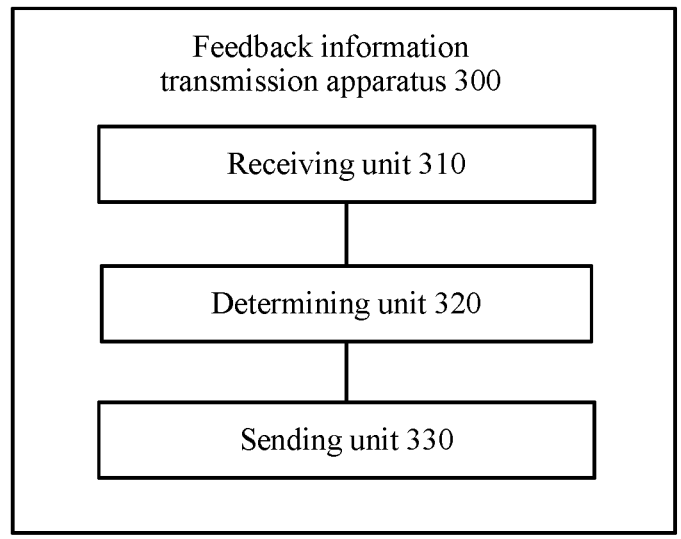
FIG. 3 is a schematic block diagram of a feedback information transmission apparatus according to an embodiment of this application.

FIG. 3 is a schematic block diagram of a feedback information transmission apparatus 300 according to an embodiment of this application. As shown in FIG. 3, the apparatus 300 includes a receiving unit 310 configured to receive N pieces of first data sent by N first transmission points, where the N first transmission points are in a one-to-one correspondence with the N pieces of first data, each piece of first data includes at least one transport block, and the N pieces of first data are carried on a same carrier, where N≥2, a determining unit 320 configured to determine at least one time-frequency resource, and a sending unit 330 configured to send feedback information of the N pieces of first data on the at least one time-frequency resource.

Optionally, the determining unit 320 is further configured to determine N time-frequency resource groups based on N downlink control channels. The N downlink control channels are in a one-to-one correspondence with the N first transmission points, each time-frequency resource group includes at least one time-frequency resource used to transmit feedback information, and the N downlink control channels are in a one-to-one correspondence with the N time-frequency resource groups.

The sending unit 330 is further configured to send the feedback information of the N pieces of first data on the N time-frequency resource groups. The feedback information of the N pieces of first data is in a one-to-one correspondence with the N time-frequency resource groups.

Optionally, the determining unit 320 is further configured to determine one time-frequency resource group based on one downlink control channel. The one time-frequency resource group includes at least one time-frequency resource, and the one downlink control channel is used to transmit downlink data transmission information of the N first transmission points.

The sending unit 330 is further configured to send the feedback information of the N pieces of first data on the one time-frequency resource group.

Optionally, the sending unit 330 is further configured to send the feedback information of the N pieces of first data on the one time-frequency resource group and a time-frequency resource indicated by first signaling received by the receiving unit 310.

Optionally, the determining unit 320 is further configured to determine a time-frequency resource group K from a plurality of time-frequency resources and a bit sequence L from a plurality of bit sequences based on the feedback information of the N pieces of first data and a preset first mapping relationship. The first mapping relationship is used to indicate a mapping relationship between a plurality of first transmission resource combinations and a plurality of first feedback value combinations, each first transmission resource combination includes at least one of the plurality of time-frequency resources and at least one of the plurality of bit sequences, each first feedback value combination includes N groups of feedback values, a first transmission resource combination to which the time-frequency resource group K and the bit sequence L belong corresponds to a first feedback value combination to which a feedback value of the feedback information of the N pieces of first data belongs, each group of feedback values includes at least one feedback value, and each bit sequence includes at least two bits.

The sending unit 330 is further configured to send the bit sequence L on the time-frequency resource group K.

Optionally, the plurality of time-frequency resources include a time-frequency resource determined based on a downlink control channel, and/or the plurality of time-frequency resources include a time-frequency resource indicated by second signaling received by the apparatus 300.

Optionally, the sending unit 330 is further configured to send the feedback information of the N pieces of first data according to a first order on one time-frequency resource indicated by third signaling received by the receiving unit 310. The first order is a ranking order of the feedback information of the N pieces of first data on the one time-frequency resource.

Indication information of the first order is preconfigured in the apparatus 300, or the first order is indicated by fourth signaling received by the receiving unit 310.

Optionally, the receiving unit 310 is further configured to receive fifth signaling. The fifth signaling is used to indicate a target feedback manner in a plurality of feedback manners, and the target feedback manner is a feedback manner of the feedback information of the N pieces of first data.

The sending unit 330 is further configured to send the feedback information of the N pieces of first data on the at least one time-frequency resource in the target feedback manner indicated by the fifth signaling.

Optionally, the receiving unit 310 is further configured to receive second data sent by a second transmission point. The first data and the second data are carried on different carriers.

The sending unit 330 is further configured to send feedback information of first data of the N−1 first coordinated transmission points, feedback information of first data of the first serving transmission point, and feedback information of the second data on the at least one time-frequency resource.

Optionally, the sending unit 330 is further configured to send the feedback information of the first data of the N−1 first coordinated transmission points on at least one first time-frequency resource, and send the feedback information of the first data of the first serving transmission point and the feedback information of the second data on at least one second time-frequency resource, or the sending unit 330 is further configured to send the feedback information of the first data of the N−1 first coordinated transmission points and the feedback information of the first data of the first serving transmission point on at least one first time-frequency resource, and send the feedback information of the second data on at least one second time-frequency resource.

The feedback information transmission apparatus 300 in this embodiment of this application may correspond to the terminal device in the method in the embodiments of this application (for example, the feedback information transmission apparatus 300 may be configured as the terminal device or may be the terminal device). In addition, all units, that is, modules, of the feedback information transmission apparatus 300 and the foregoing other operations and/or functions are separately used to implement corresponding procedures performed by the terminal device in the method 200 in FIG. 2. For brevity, details are not described herein again.

According to the feedback information transmission apparatus in this embodiment of this application, in a coordinated multipoint multi-stream transmission technology, after receiving, using a same carrier, a plurality of pieces of data transmitted by a plurality of transmission points, the terminal device sends feedback information of the plurality of pieces of data to the plurality of transmission points using one or more time-frequency resources such that the plurality of transmission points learn of a receiving status of transmitted data, to improve reliability of coordinated multipoint multi-stream transmission.

Figure 4:
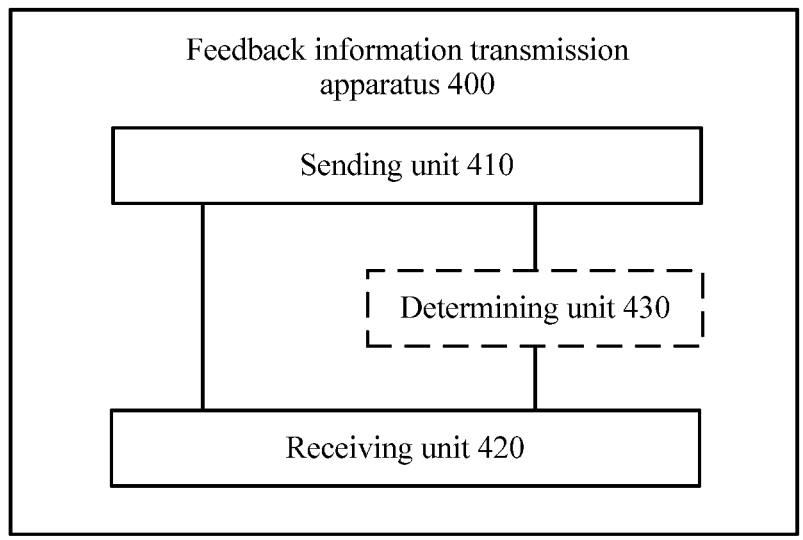
FIG. 4 is a schematic block diagram of a feedback information transmission apparatus according to another embodiment of this application.

FIG. 4 is a schematic block diagram of a feedback information transmission apparatus 400 according to another embodiment of this application, and the apparatus 400 is one of N first transmission points. As shown in FIG. 4, the apparatus 400 includes a sending unit 410 configured to send first data Di in N pieces of first data to a terminal device, where the apparatus 400 is one of N first transmission points, the N first transmission points are in a one-to-one correspondence with the N pieces of first data, and the N pieces of first data are carried on a same carrier, where N≥2, and a receiving unit 420 configured to receive feedback information of the first data Di, where feedback information of the N pieces of first data including the feedback information of the first data Di is carried on at least one time-frequency resource.

Optionally, the apparatus 400 further includes a determining unit 430 configured to determine a time-frequency resource group T in N time-frequency resource groups based on a downlink control channel T in N downlink control channels, where the N downlink control channels are in a one-to-one correspondence with the N first transmission points, each time-frequency resource group includes at least one time-frequency resource used to transmit feedback information, the N downlink control channels are in a one-to-one correspondence with the N time-frequency resource groups, and the feedback information of the N pieces of first data is in a one-to-one correspondence with the N time-frequency resource groups.

The receiving unit 420 is further configured to receive the feedback information of the first data Di on the time-frequency resource group T.

Optionally, the apparatus 400 further includes a determining unit 430 configured to determine one time-frequency resource group based on one downlink control channel, where the one downlink control channel is used to transmit downlink data transmission information of the N first transmission points, and the one time-frequency resource group includes at least one time-frequency resource.

The receiving unit 420 is further configured to receive the feedback information of the first data Di on the one time-frequency resource group.

Optionally, the receiving unit 420 is further configured to receive the feedback information of the first data Di on the one time-frequency resource group and a time-frequency resource indicated by first signaling.

Optionally, the receiving unit 420 is further configured to receive, on a time-frequency resource group K in a plurality of time-frequency resources, a bit sequence L in a plurality of bit sequences sent by the terminal device. Each bit sequence includes at least two bits.

The apparatus 400 further includes a determining unit 430 configured to determine the feedback information of the N pieces of first data based on the time-frequency resource group K, the bit sequence L, and a preset first mapping relationship, and determine the feedback information of the first data Di from the feedback information of the N pieces of first data, where the first mapping relationship is used to indicate a mapping relationship between a plurality of first transmission resource combinations and a plurality of first feedback value combinations, each first transmission resource combination includes at least one of the plurality of time-frequency resources and at least one of the plurality of bit sequences, each first feedback value combination includes N groups of feedback values, a first transmission resource combination to which the time-frequency resource group K and the bit sequence belong corresponds to a first feedback value combination to which a feedback value of the feedback information of the N pieces of first data belongs, and each group of feedback values includes at least one feedback value.

Optionally, the plurality of time-frequency resources include a time-frequency resource determined based on a downlink control channel, and/or the plurality of time-frequency resources include a time-frequency resource indicated by second signaling received by the terminal device.

Optionally, the receiving unit 420 is further configured to receive the feedback information of the N pieces of first data on one time-frequency resource indicated by third signaling.

The feedback information of the N pieces of first data is sent by the terminal device according to a first order, and the first order is a ranking order of the feedback information of the N pieces of first data on the one time-frequency resource.

The apparatus 400 further includes a determining unit 430 configured to determine the feedback information of the first data Di from the feedback information of the N pieces of first data according to the first order.

Optionally, the apparatus 400 further includes a determining unit 430 configured to determine a target feedback manner from a plurality of feedback manners, where the target feedback manner is a manner that is indicated by fifth signaling and that is of sending the feedback information of the N pieces of first data by the terminal device.

The receiving unit 420 is further configured to receive the feedback information of the first data Di in the target feedback manner.

Optionally, the N first transmission points include a first serving transmission point and N−1 first coordinated transmission points of the terminal device, the first data and second data are carried on different carriers, and the second data is sent by a second transmission point to the terminal device.

Optionally, feedback information of first data of the N−1 first coordinated transmission points is carried on at least one first time-frequency resource, and feedback information of first data of the first serving transmission point and feedback information of the second data are carried on at least one second time-frequency resource, or feedback information of first data of the N−1 first coordinated transmission points and feedback information of first data of the first serving transmission point are carried on at least one first time-frequency resource, and feedback information of the second data is carried on at least one second time-frequency resource.

The feedback information transmission apparatus 400 in this embodiment of this application may correspond to the first transmission point (for example, a first serving transmission point or a first coordinated transmission point) in the method in the embodiments of this application (for example, the feedback information transmission apparatus 400 may be configured as the first transmission point or may be the first transmission point). In addition, all units, that is, modules, of the feedback information transmission apparatus 400 and the foregoing other operations and/or functions are separately used to implement corresponding procedures performed by the first transmission point in the method 200 in FIG. 2. For brevity, details are not described herein again.

According to the feedback information transmission apparatus in this embodiment of this application, in a coordinated multipoint multi-stream transmission technology, after receiving, using a same carrier, a plurality of pieces of data transmitted by a plurality of transmission points, the terminal device sends feedback information of the plurality of pieces of data to the plurality of transmission points using one or more time-frequency resources such that the plurality of transmission points learn of a receiving status of transmitted data, to improve reliability of coordinated multipoint multi-stream transmission.

The feedback information transmission method in the embodiments of this application is described in detail above with reference to FIG. 2, and feedback information transmission devices in the embodiments of this application are described in detail below with reference to FIG. 5 and FIG. 6.

Figure 5:
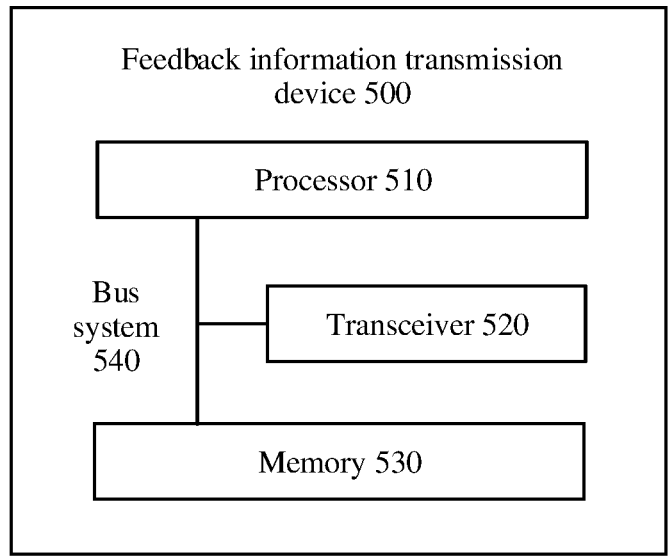
FIG. 5 is a schematic structural diagram of a feedback information transmission device according to an embodiment of this application.

FIG. 5 is a schematic block diagram of a feedback information transmission device 500 according to an embodiment of this application. As shown in FIG. 5, the device 500 includes a processor 510 and a transceiver 520, and the processor 510 is connected to the transceiver 520. Optionally, the device 500 further includes a memory 530. The memory 530 is connected to the processor 510. Further, optionally, the device 500 includes a bus system 540. The processor 510, the memory 530, and the transceiver 520 may be connected using the bus system 540. The memory 530 may be configured to store an instruction. The processor 510 is configured to execute the instruction stored in the memory 530, to control the transceiver 520 to send information or a signal.

The processor 510 may correspond to the determining unit 320 in the apparatus 300 shown in FIG. 3, and the transceiver may correspond to the sending unit 330 and the receiving unit 310 in the apparatus 300 in FIG. 3.

The feedback information transmission device 500 in this embodiment of this application may correspond to the terminal device in the method in the embodiments of this application. In addition, all units, that is, modules, of the feedback information transmission device 500 and the foregoing other operations and/or functions are separately used to implement corresponding procedures performed by the terminal device in the method 200 in FIG. 2. For brevity, details are not described herein again.

According to the feedback information transmission device in this embodiment of this application, in a coordinated multipoint multi-stream transmission technology, after receiving, using a same carrier, a plurality of pieces of data transmitted by a plurality of transmission points, the terminal device sends feedback information of the plurality of pieces of data to the plurality of transmission points using one or more time-frequency resources such that the plurality of transmission points learn of a receiving status of transmitted data, to improve reliability of coordinated multipoint multi-stream transmission.

Figure 6:
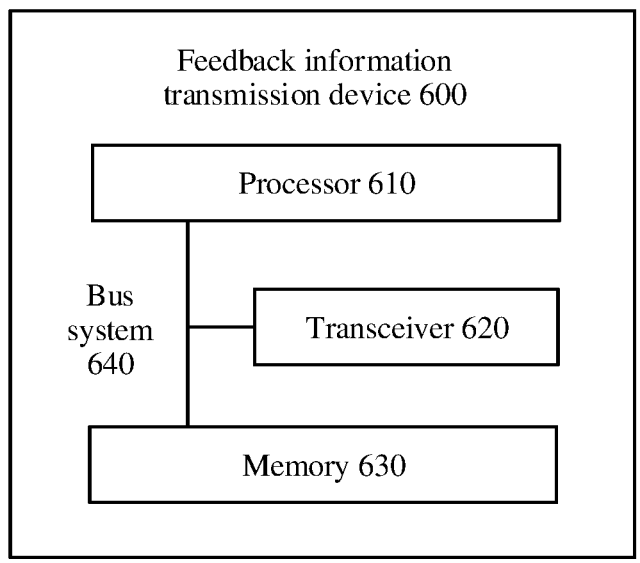
FIG. 6 is a schematic structural diagram of a feedback information transmission device according to another embodiment of this application.

FIG. 6 is a schematic block diagram of a feedback information transmission device 600 according to another embodiment of this application, and the device 600 is one of N first transmission points. As shown in FIG. 6, the device 600 includes a processor 610 and a transceiver 620, and the processor 610 is connected to the transceiver 620. Optionally, the device 600 further includes a memory 630, and the memory 630 is connected to the processor 610. Further, optionally, the device 600 includes a bus system 640. The processor 610, the memory 630, and the transceiver 620 may be connected using the bus system 640. The memory 630 may be configured to store an instruction. The processor 610 is configured to execute the instruction stored in the memory 630, to control the transceiver 620 to send information or a signal.

The processor 610 may correspond to the determining unit 430 in the apparatus 400 shown in FIG. 4, and the transceiver may correspond to the sending unit 410 and the receiving unit 420 in the apparatus 400 in FIG. 4.

The feedback information transmission device 600 in this embodiment of this application may correspond to the first transmission point (for example, a first serving transmission point or a first coordinated transmission point) in the method in the embodiments of this application. In addition, all units, that is, modules, of the feedback information transmission device 600 and the foregoing other operations and/or functions are separately used to implement corresponding procedures performed by the first transmission point in the method 200 in FIG. 2. For brevity, details are not described herein again.

According to the feedback information transmission device in this embodiment of this application, in a coordinated multipoint multi-stream transmission technology, after receiving, using a same carrier, a plurality of pieces of data transmitted by a plurality of transmission points, a terminal device sends feedback information of the plurality of pieces of data to the plurality of transmission points using one or more time-frequency resources such that the plurality of transmission points learn of a receiving status of transmitted data, to improve reliability of coordinated multipoint multi-stream transmission.

It should be understood that in the embodiments of the present disclosure, the processor may be a CPU, or the processor may be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor, or the processor may be any conventional processor or the like.

The memory may include a read-only memory (ROM) and a random access memory (RAM), and provide an instruction and data for the processor. A part of the memory may further include a non-volatile RAM. For example, the memory may further store device type information.

The bus system may include a power bus, a control bus, a status signal bus, and the like in addition to a data bus. However, for clear description, various types of buses in the figure are marked as the bus system.

In an implementation process, steps in the foregoing method can be implemented using a hardware integrated logical circuit in the processor, or using an instruction in a form of software. The steps of the method disclosed with reference to the embodiments of this application may be directly performed by a hardware processor, or may be performed using a combination of hardware in the processor and a software module. The software module may be located in a mature storage medium in the art, such as a RAM, a flash memory, a ROM, a programmable ROM (PROM), an electrically erasable programmable memory, or a register. The storage medium is located in the memory, and the processor reads information in the memory and completes the steps in the foregoing method in combination with hardware in the processor. To avoid repetition, details are not described herein again.

It should be understood that the term "and/or" in this specification describes only an association relationship for describing associated objects and represents that three relationships may exist. For example, A and/or B may represent the following three cases Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A feedback information transmission method, implemented by a terminal device, the feedback information transmission method comprising:
   receiving a signaling indicating a target feedback manner in a plurality of feedback manners;
   receiving, from a plurality of transmission points, N pieces of first data in one time unit, wherein the target feedback manner is a feedback manner of feedback information of the N pieces of data, wherein each of the N pieces of the first data comprises at least one transport block, wherein the N pieces of the first data are carried on a same carrier, and wherein N≥two; and
   sending, according to the target feedback manner, the feedback information of the N pieces of the first data on at least one time-frequency resource to the plurality of transmission points.

2. The feedback information transmission method of claim 1, wherein sending the feedback information comprises:
   determining N time-frequency resource groups based on N downlink control channels, wherein each time-frequency resource group comprises at least one time-frequency resource transmitting feedback information, wherein the N downlink control channels are in a one-to-one correspondence with the N time-frequency resource groups, wherein the N downlink control channels are in a one-to-one correspondence with the N pieces of the first data, and wherein each downlink control channel transmits downlink data transmission information of corresponding pieces of the first data; and
   sending the feedback information of the N pieces of the first data on the N time-frequency resource groups, wherein the feedback information of the N pieces of the first data is in a one-to-one correspondence with the N time-frequency resource groups.

3. The feedback information transmission method of claim 1, wherein sending the feedback information comprises:
   determining one time-frequency resource group based on one downlink control channel, wherein the one time-frequency resource group comprises the at least one time-frequency resource, and wherein the one downlink control channel transmits downlink data transmission information of the N pieces of the first data; and
   sending the feedback information of the N pieces of the first data on the one time-frequency resource group.

4. The feedback information transmission method of claim 1, wherein sending the feedback information comprises:
   determining a time-frequency resource group from a plurality of time-frequency resources and a bit sequence from a plurality of bit sequences based on the feedback information of the N pieces of the first data and a preset first mapping relationship, wherein the preset first mapping relationship indicates a mapping relationship between a plurality of first transmission resource combinations and a plurality of first feedback value combinations, wherein each first transmission resource combination comprises at least one of the time-frequency resources and at least one of the bit sequences, wherein each first feedback value combination comprises N groups of feedback values, wherein a first transmission resource combination to which the time-frequency resource group and the bit sequence belong corresponds to a first feedback value combination to which a feedback value of the feedback information of the N pieces of the first data belongs, wherein each group of feedback values comprises at least one feedback value, wherein each bit sequence comprises at least two bits, and wherein the time-frequency resource group comprises the at least one of the time-frequency resources; and sending the bit sequence on the time-frequency resource group.

5. The feedback information transmission method of claim 1, wherein sending the feedback information comprises sending the feedback information of the N pieces of the first data according to a first order on one time-frequency resource, wherein the first order is a ranking order of the feedback information of the N pieces of the first data on the one time-frequency resource, and wherein indication information of the first order is determined based on a reference signal antenna port group corresponding to at least one of the N pieces of the first data.

6. The feedback information transmission method of claim 1, wherein the feedback information indicates a status of receiving the N pieces of the first data.

7. The feedback information transmission method of claim 6, wherein the feedback information comprises one or more of an acknowledgement (ACK) or a negative ACK (NACK).

8. An apparatus, comprising:
a transceiver configured to:
receive, from a plurality of transmission points, N pieces of first data sent in one time unit, wherein each of the N pieces of the first data comprises at least one transport block, wherein the N pieces of the first data are carried on a same carrier, and wherein N≥two; and
receive a signaling, wherein the signaling indicates a target feedback manner in a plurality of feedback manners, and wherein the target feedback manner is a feedback manner of feedback information of the N pieces of data; and
a processor coupled to the transceiver and configured to determine at least one time-frequency resource,
wherein the transceiver is further configured to send, according to the target feedback manner, the feedback information of the N pieces of the first data on the at least one time-frequency resource to the plurality of transmission points.

9. The apparatus of claim 8, wherein the processor is further configured to determine N time-frequency resource groups based on N downlink control channels, wherein each time-frequency resource group comprises at least one time-frequency resource transmitting feedback information, wherein the N downlink control channels are in a one-to-one correspondence with the N time-frequency resource groups, wherein the N downlink control channels are in a one-to-one correspondence with the N pieces of the first data, wherein each downlink control channel transmits downlink data transmission information of corresponding pieces of the first data, wherein the transceiver is further configured to send the feedback information of the N pieces of the first data on the N time-frequency resource groups, and wherein the feedback information of the N pieces of the first data is in a one-to-one correspondence with the N time-frequency resource groups.

10. The apparatus of claim 8, wherein the processor is further configured to determine one time-frequency resource group based on one downlink control channel, wherein the one time-frequency resource group comprises the at least one time-frequency resource, wherein the one downlink control channel transmits downlink data transmission information of the N pieces of the first data, and wherein the transceiver is configured to send the feedback information of the N pieces of the first data on the one time-frequency resource group.

11. The apparatus of claim 8, wherein the processor is further configured to determine a time-frequency resource group from a plurality of time-frequency resources and a bit sequence from a plurality of bit sequences based on the feedback information of the N pieces of the first data and a preset first mapping relationship, wherein the preset first mapping relationship indicates a mapping relationship between a plurality of first transmission resource combinations and a plurality of first feedback value combinations, wherein each first transmission resource combination comprises at least one of the time-frequency resources and at least one of the bit sequences, wherein each first feedback value combination comprises N groups of feedback values, wherein a first transmission resource combination to which the time-frequency resource group and the bit sequence belong corresponds to a first feedback value combination to which a feedback value of the feedback information of the N pieces of the first data belongs, wherein each group of feedback values comprises at least one feedback value, wherein each bit sequence comprises at least two bits, and wherein the transceiver is further configured to send the bit sequence on the time-frequency resource group.

12. The apparatus of claim 8, wherein the transceiver is further configured to send the feedback information of the N pieces of the first data according to a first order on one time-frequency resource, wherein the first order is a ranking order of the feedback information of the N pieces of the first data on the one time-frequency resource, and wherein indication information of the first order is determined based on a reference signal antenna port group corresponding to at least one of the N pieces of the first data.

13. The apparatus of claim 8, wherein the feedback information comprises one or more of an acknowledgement (ACK) or a negative ACK (NACK).

14. An apparatus, comprising:
a memory configured to store instructions;
a processor coupled to the memory and configured to determine a target feedback manner from a plurality of feedback manners, wherein the target feedback manner is indicated to a terminal device by a signaling; and
a transceiver coupled to the memory, wherein the instructions cause the transceiver to be configured to:
send a first piece of data (Di) in N pieces of first data to the terminal device, wherein the apparatus is one of N first transmission points, wherein the N first transmission points are in a one-to-one correspondence with the N pieces of the first data, wherein the N pieces of the first data are carried on a same carrier, and wherein N≥two; and
receive, according to the target feedback manner, feedback information of the Di, wherein feedback information of the N pieces of the first data comprising the feedback information of the Di is carried on at least one time-frequency resource to the N first transmission points, wherein the target feedback manner is a feedback manner of the feedback information of the N pieces of data.

15. The apparatus of claim 14, further comprising a processor coupled to the memory and configured to determine a time-frequency resource group in N time-frequency resource groups based on a downlink control channel in N downlink control channels, wherein the N downlink control channels are in a one-to-one correspondence with the N first transmission points, wherein each time-frequency resource group comprises at least one time-frequency resource transmitting feedback information, wherein the N downlink control channels are in a one-to-one correspondence with the N time-frequency resource groups, wherein the feedback information of the N pieces of the first data is in a one-to-one correspondence with the N time-frequency resource groups, and wherein the instructions further cause the transceiver to be configured to receive the feedback information of the Di on the time-frequency resource group.

16. The apparatus of claim 14, further comprising a processor coupled to the memory and configured to determine one time-frequency resource group based on one downlink control channel, wherein the one downlink control channel transmits downlink data transmission information of the N first transmission points, wherein the one time-frequency resource group comprises at least one time-frequency resource, and wherein the instructions further cause the transceiver to be configured to receive the feedback information of the Di on the one time-frequency resource group.

17. The apparatus of claim 14, wherein the instructions further cause the transceiver to be configured to receive, on a time-frequency resource group in a plurality of time-frequency resources, a bit sequence in a plurality of bit sequences from the terminal device, wherein each bit sequence comprises at least two bits, wherein the apparatus further comprises a processor coupled to the memory and configured to:
   determine the feedback information of the N pieces of the first data based on the time-frequency resource group, the bit sequence, and a preset first mapping relationship; and
   determine the feedback information of the Di from the feedback information of the N pieces of the first data, wherein the first mapping relationship indicates a mapping relationship between a plurality of first transmission resource combinations and a plurality of first feedback value combinations, wherein each first transmission resource combination comprises at least one of the time-frequency resources and at least one of the bit sequences, wherein each first feedback value combination comprises N groups of feedback values, wherein a first transmission resource combination to which the time-frequency resource group and the bit sequence belong corresponds to a first feedback value combination to which a feedback value of the feedback information of the N pieces of the first data belongs, and wherein each group of feedback values comprises at least one feedback value.

18. The apparatus of claim 14, wherein the instructions further cause the transceiver to be configured to receive the feedback information of the N pieces of the first data on one time-frequency resource, wherein the feedback information of the N pieces of the first data is received from the terminal device according to a first order, wherein the first order is a ranking order of the feedback information of the N pieces of the first data on the one time-frequency resource, wherein the apparatus further comprises a processor coupled to the memory and configured to determine the feedback information of the Di from the feedback information of the N pieces of the first data according to the first order, and wherein indication information of the first order is determined based on a reference signal antenna port group corresponding to at least one of the N pieces of the first data.

19. The apparatus of claim 14, wherein the feedback information indicates a status of receiving the N pieces of the first data.

20. The apparatus of claim 19, wherein the feedback information comprises one or more of an acknowledgement (ACK) or a negative ACK (NACK).

* * * * *